United States Patent
Rowen et al.

(10) Patent No.: US 12,235,141 B2
(45) Date of Patent: Feb. 25, 2025

(54) REAL-TIME QUASI-COHERENT DETECTION AND FIBER SENSING USING MULTI-FREQUENCY SIGNALS

(71) Applicant: PRISMA PHOTONICS LTD, Tel Aviv (IL)

(72) Inventors: Eitan Rowen, Modi'in (IL); Niv Gorodesky, Rehovot (IL); Eran Inbar, Tel Aviv (IL)

(73) Assignee: PRISMA PHOTONICS LTD, Tel Aviv (IL)

( * ) Notice: Subject to any disclaimer, the term of this patent is extended or adjusted under 35 U.S.C. 154(b) by 0 days.

(21) Appl. No.: 18/684,466

(22) PCT Filed: Aug. 18, 2022

(86) PCT No.: PCT/IL2022/050908
§ 371 (c)(1),
(2) Date: Feb. 16, 2024

(87) PCT Pub. No.: WO2023/021519
PCT Pub. Date: Feb. 23, 2023

(65) Prior Publication Data
US 2024/0263972 A1    Aug. 8, 2024

Related U.S. Application Data

(60) Provisional application No. 63/398,534, filed on Aug. 17, 2022, provisional application No. 63/234,255, filed on Aug. 18, 2021.

(51) Int. Cl.
*G01D 5/353*    (2006.01)

(52) U.S. Cl.
CPC ..... *G01D 5/35364* (2013.01); *G01D 5/35312* (2013.01); *G01D 5/3538* (2013.01); *G01D 5/35383* (2013.01)

(58) Field of Classification Search
CPC .......... G01D 5/35364; G01D 5/35312; G01D 5/3538; G01D 5/35383
See application file for complete search history.

(56) References Cited

U.S. PATENT DOCUMENTS

9,170,149 B2 * 10/2015 Hartog ................. G01M 11/083
2010/0165327 A1 * 7/2010 Hartog ................... G01K 11/32
356/73.1

(Continued)

FOREIGN PATENT DOCUMENTS

WO    2017095370 A1    6/2017
WO    2018134137 A1    7/2018

OTHER PUBLICATIONS

International Search Report and Written Opinion received for PCT Serial No. PCT/IL2022/050908 on Dec. 25, 2022, 7 pgs.
Gu, Jinfeng, et al., "High SNR-OTDR Based on Frequency and Wavelength Diversity with Differential Vector Aggregation Method", IEEE Photonics Journal, vol. 12, No. 6, Dec. 2020, 13 pgs.

(Continued)

*Primary Examiner* — Jonathan M Hansen
(74) *Attorney, Agent, or Firm* — Merchant & Gould P.C.

(57) ABSTRACT

Distributed acoustic sensing (DAS) system for quasi-coherent detection of at least one multi-frequency signal over an optical fiber, including a multi-frequency pulse generator, a circulator, a coherent detector and a processor, the pulse generator for generating at least one multi-frequency pulse train including at least two pulses each having a different frequency, the pulse train including a plurality of carriers, the coherent detector for receiving at least one backscattered signal from the optical fiber and the processor for quasi-coherent aggregation of the carriers in the backscattered signal, wherein the processor channelizes the backscattered signal into at least one complex signal for each frequency in the carriers and wherein for each complex signal, the processor respectively extracts at least one of an amplitude change and a phase change for each one of the carriers and (Continued)

selectively aggregates at least one of the changes for the carriers for determining if an event has occurred over the optical fiber.

34 Claims, 12 Drawing Sheets

(56) References Cited

U.S. PATENT DOCUMENTS

| | | | |
|---|---|---|---|
| 2013/0113629 A1* | 5/2013 | Hartog | G01V 1/226 |
| | | | 340/853.2 |
| 2018/0045542 A1 | 2/2018 | Ramirez-Mancilla | |
| 2019/0226885 A1* | 7/2019 | Rowen | G01D 5/353 |
| 2020/0249075 A1 | 8/2020 | Ma | |

OTHER PUBLICATIONS

Murray, Matthew J., et al., "Quantitative amplitude measuring -OTDR with pe/Hz sensitivity using a multi-frequency pulse train", Optics Letters, Jun. 15, 2020, 4 pgs.

Zabihi, Mohammadmasoud, et al., "Continuous Fading Suppression Method for -OTDR systems using optimum tracking over multiple probe frequencies", Journal of Lightwave Technology, vol. 37, No. 14, Jul. 15, 2019, 9 pgs.

Hartog, A.H., "The use of multi-frequency acquisition to significantly improve the quality of fibre-optic-distributed vibration sensing", Geophysical Prospecting, doi: 10.1111/1365-2478.12612, Dec. 2017, 11 pgs.

Wang, Zhaoyang, et al., "Recent progress in distributed fiber acoustic sensing with -OTDR", Sensors, Oct. 13, 2020, 26 pgs.

Hartog, Arthur H., "An Introduction to Distributed Optical Fibre Sensors", CRC Press Taylor & Francis Group, 2017, 471 pgs.

* cited by examiner

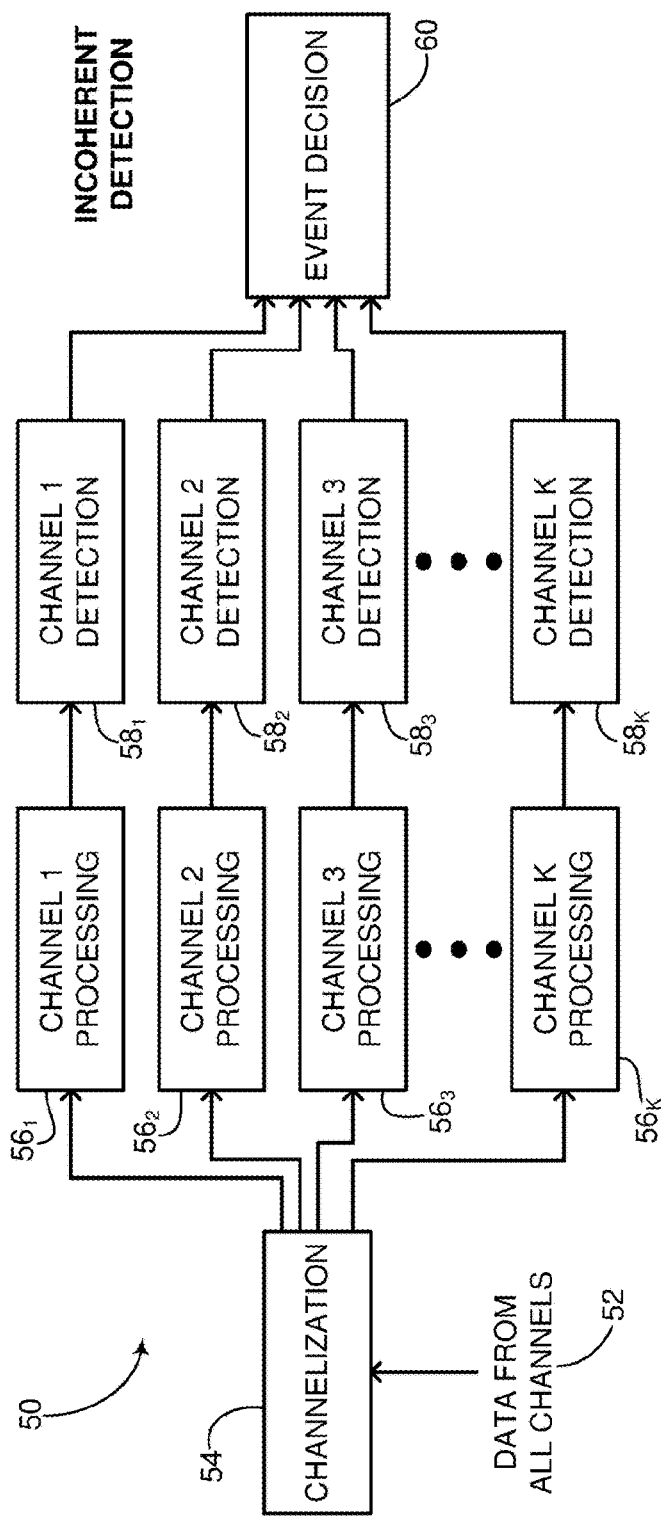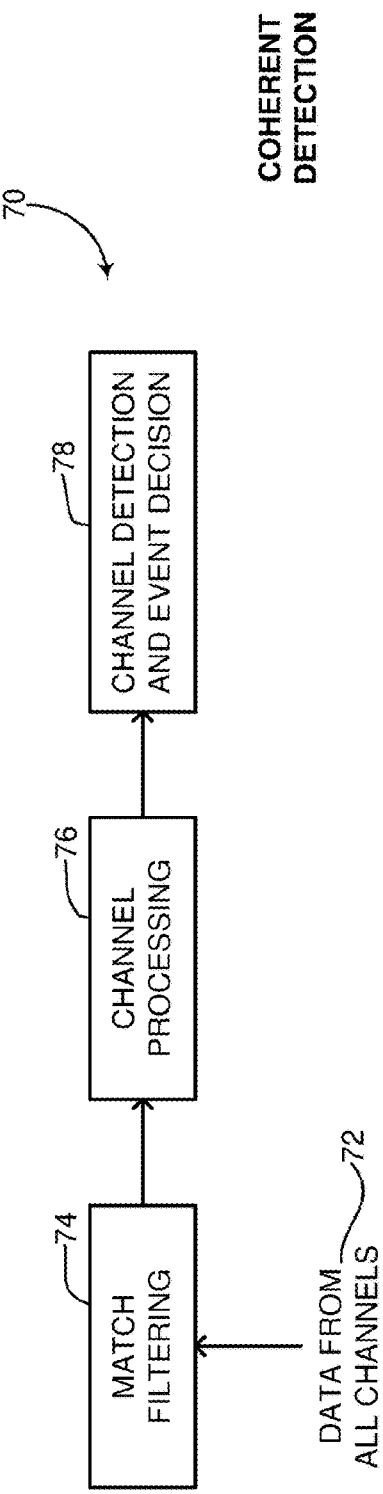

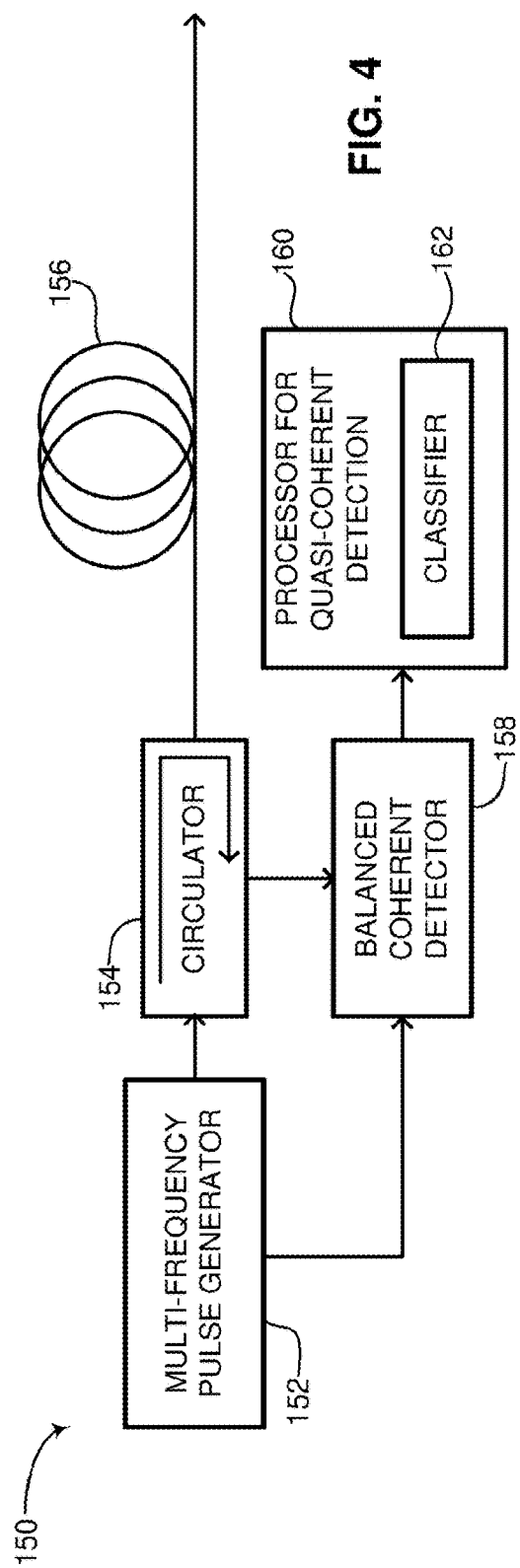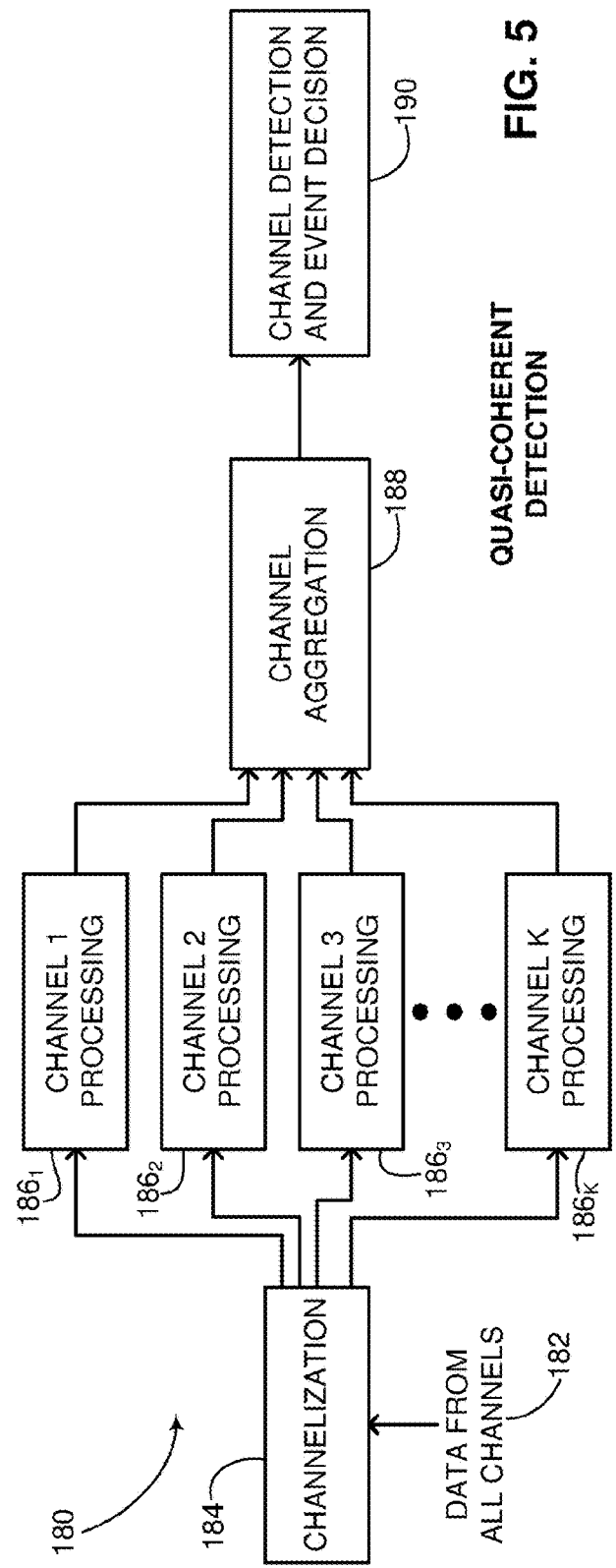

REAL-TIME QUASI-COHERENT DETECTION AND FIBER SENSING USING MULTI-FREQUENCY SIGNALS

CROSS-REFERENCE TO RELATED APPLICATIONS

The present application is a National Stage Filing of PCT International Patent Application No. PCT/IL2022/050908, filed Aug. 18, 2022, which claims the benefit of priority to US Provisional Application No. 63/234,255, filed Aug. 18, 2021 and US Provisional Application No. 63/398,534, filed Aug. 17, 2022, which applications are incorporated herein by reference in their entireties.

FIELD OF THE DISCLOSED TECHNIQUE

The disclosed technique relates to distributed acoustic sensing (herein abbreviated as DAS) systems over fiber optics, in general, and to methods and systems for improving the signal-to-noise ratio (herein abbreviated as SNR) and linearity in real-time DAS systems using multi-frequency signals, in particular.

BACKGROUND OF THE DISCLOSED TECHNIQUE

DAS enables the monitoring of long-range infrastructures outfitted with fiber optics (herein referred to as well as optical fibers or simply fibers) by detecting Rayleigh backscattered light. Changes in the Rayleigh backscattered light are measured and used as an indication of changes in the environment along the fiber. Typically, a light source such as a narrowband laser pulse is transmitted into the fiber and a detector located at the same end as the light source receives backscattered light. By comparing the backscattered light from a given region along the fiber originating from different pulses, physical changes (i.e., events) in the environment over the region of the fiber can be detected and monitored.

The backscattered light (also referred to as a backscattered signal) is a result of the interference of many backscattered fields from scattering locations distributed within half a pulse length (herein referred to a backscattering cell). Since the location of the interference of the different light pulses is unknown, a backscattered signal is generally considered a random signal (both in terms of amplitude and phase). Stated otherwise the backscattered signal can be considered a phasor sum of unknown phasors which depend on scattering coefficients of the optical fiber and the locations along the optical fiber where events occurred. Regardless, different characteristics of the backscattered light can be measured in order to detect changes in the fiber environment. Typically, either the intensity or the phase of the backscattered light is measured. The intensity of the backscattered light can be measured, and changes in intensity can be correlated to a disturbance along the fiber in a given region, indicating for example a change in strain, temperature or vibrations in the given region. However, changes in intensity are not linear (and may not even be monotonic) in relation to the disturbance thus making intensity a more challenging characteristic to use for monitoring backscattered signals.

Changes over time of the phase of the backscattered light from certain locations along the fiber are correlated with changes in the index of refraction along the entire length of fiber up to the point where the backscattering signal originates from. Changes in the difference in phases between two close locations yield a signal that is linear in the average change of optical length between the two locations. This is used, for example in phase optical time-domain reflectometry (herein abbreviated as $\varphi$-OTDR). Unlike intensity, the changes in phase have a linear relation with the changes in the index of refraction, thus making phase a more preferred characteristic to use for monitoring backscattered signals. A general overview of DAS systems using $\varphi$-OTDR can be found in Chapters 3 and 6 of "An Introduction to Distributed Optical Fibre Sensors" by Arthur H. Hartog, CRC Press, Boca Raton, FL, USA, 2017.

Whereas DAS systems can detect events along a fiber optic there are nevertheless at least four different challenges which DAS systems need to contend with in order to increase both the resolution at which events can be detected as well as the length along the fiber optic at which an event can be detected through backscattered signals. A first (1) challenge relates to the measured power of backscattered signals which is directly related to the peak power of the transmitted signal. As non-linear effects are to be avoided in DAS systems, the maximum power of the transmitted signal must remain below the threshold for non-linear effects in the backscattered signals, thereby resulting is very low power signals for the backscattered signals which are harder to detect, compute and process. For example, if the peak transmission power is 10 milliwatts for a pulse having a time duration of 100 nanoseconds, the power of the backscattered signal at the start of the fiber optic will be around 10 nanowatts. Every 25 km the transmitted pulse travels down the fiber optic, the power of the backscattered signal reflecting to the start of the fiber optic will decrease by an order of magnitude. Thus the amplitude of the backscattered signals at such distances will be very low and will continue to get lower the further down the fiber optic the transmitted pulse travels.

A second (2) challenge relates to the non-uniformity of the power of the backscattered signals. Interference of backscattered fields from a backscattering cell causes the phenomenon known as Rayleigh fading. Rayleigh fading occurs because of differences in interference of different backscattered signals that occur along the optical fiber, resulting in areas along the fiber optic where there is constructive interference and other areas along the fiber optic where there is destructive interference. Thus, the received power of backscattered signals can be orders of magnitude lower from certain regions along the fiber as compared to others along the fiber in a non-uniform manner. These fluctuations are not constant in time, and locations of destructive interference at a given moment can change to have constructive interference due to slow changes in temperature or strain (for example) and vice versa. This can result in a fluctuation of the SNR of the backscattered signals. Whereas such an SNR can be averaged, it does not produce accurate results, nor is it a good indicator of where events are occurring over the fiber optic. As just mentioned, Rayleigh fading is the destructive interference between different scatterers, thus if the amplitude of the backscattered signal is small, noise then causes the phase to be random. Since backscattered signals are very weak as compared to the transmitted light pulse, improving the SNR of the backscattered signals is a major hurdle to overcome in DAS systems.

A third (3) challenge relates to a tradeoff between the amount of energy in a backscattered signal versus the spatial resolution that can be achieved in detecting events. In general, longer pulses will scatter more energy to the backscattered signal, leading to better SNR, however longer pulses also cause a decrease in spatial resolution. Therefore if the spatial resolution is increased (through shortening the pulses) a lower SNR will be achieved. As mentioned however, if the SNR is increased through transmitting longer pulses, this can decrease the spatial resolution.

A fourth (4) challenge, which is often ignored in DAS systems, is the non-linearity of the phase of backscattered signals where an event (such a change in temperature and/or strain) occurs. As mentioned above DAS systems measure the phase differences from two different sets of locations (as mentioned above, this is referred to as a backscattering cell which is defined by the fiber segment that contributes to the backscattered signal at a given time). Thus, the phase differences between two backscattered cells are compared in DAS systems, however it is assumed that the difference is linear to the measured disturbance, which is usually non-linear. While there is indeed a linear dependence on the signal between two backscattering cells, there is a non-linear and even non-monotonic dependence on the strain changes in the backscattering cells themselves, as demonstrated below in FIG. 10. In the prior art this problem which itself can lead to additional sources of noise in the backscattered signal is usually neglected. This challenge can also lead to issues in classification because this source of noise is not considered in the processing. For example, methods for analyzing the phase of backscattered signals usually assume a linearity of the change in the phase difference between the backscattered d fields from two backscattering cells to the change in strain due to an event occurring near the optical fiber. Whereas such assumptions may be valid in laboratory settings, they are rarely valid in real-life situations where an optical fiber is situated in an environment that may have many sources of external noise (vehicles, agricultural equipment, train tracks, construction sites and the like). In such scenarios, it can only be assumed that the phase of any backscattered signal from the cells themselves has a non-linear response, thus making it difficult to correlate changes in the phase of the backscattered signal to an event on the optical fiber as well as to the location of the event on the optical fiber.

Known in the prior art are systems and methods for addressing challenge (2) by the use of a transmitted light pulse having multiple frequencies, also known as frequency diversity. The notion of frequency diversity has been suggested for decreasing noise effects in the backscattered signals for improving the obtained SNR and thus overcoming the issues caused by Rayleigh fading. Examples of multi-frequency DAS systems over fiber optics for addressing the challenges of Rayleigh fading are known in the art, such as presented in an article to Zabihi et al., entitled "Continuous Fading Suppression Method for φ-OTDR Systems Using Optimum Tracking Over Multiple Probe Frequencies", published in the Journal of Lightwave Technology, Vol. 37, No. 14, Jul. 15, 2019, pp. 3602-3610, also in an article to Gu et al., entitled "High SNR φ-OTDR Based on Frequency and Wavelength Diversity With Differential Vector Aggregation Method", published in IEEE Photonics Journal, Vol. 12, No. 6, December 2020, also in an article to Wang et al., entitled "Recent Progress in Distributed Fiber Acoustic Sensing with φ-OTDR", published in Sensors, Vol. 20, No. 6594, 2020 and further in an article to Hartog et al., entitled "The use of multi-frequency acquisition to significantly improve the quality of fibre-optic-distributed vibration sensing", published in Geophysical Prospecting, Vol. 66, 2018, pp. 192-202. The article to Hartog et al. also provides some general thoughts on addressing challenge (4) without providing any specifics.

As mentioned above, multi-frequency OTDR has been suggested and is known in the art as a method for overcoming Rayleigh fading, since different frequencies will have different locations of destructive interference along the fiber depending on the backscattering coefficient at a particular frequency and region of interest. However, the improvement, which depends on the number of frequencies used, is a negative exponent. Since fading is statistical, if 10% of the fiber has unacceptable fading (in the literature of the art this it typical), a multi-frequency signal with three frequencies will reduce the region of unacceptable fading to 0.1% if the fading noise is uncorrelated. The reduction can be expressed mathematically as $$\frac{1}{p^K}$$

where p is the percent of unacceptable fading locations along a length of optical fiber and K is the number of frequencies in the multi-frequency signal (thus using the mathematical expression above, unacceptable fading is when p is around 0.1). In the example of 10% unacceptable fading. 3-4 frequencies in the multi-frequency signal are typically enough for overcoming Rayleigh fading.

It is noted however that the mere use of a few multi-frequency light pulses does not resolve the issue of the non-linearity of the backscattered signals as mentioned above (challenge (4)) and thus still presents a challenge for analyzing backscattered signals for monitoring events occurring over a fiber in a long-distance DAS system. The mere use of multi-frequency pulses also does not directly address challenge (3).

Reference is now made to FIG. 1, which is a schematic illustration of a DAS system using a multi-wavelength signal over fiber optics, generally referenced 10, as is known in the prior art. DAS system 10 is based on the aforementioned article to Gu et al. and includes a plurality of laser sources 12A-12D, each respectively coupled with a plurality of couplers 14A-14D. Each one of plurality of laser sources 12A-12D generates a laser pulse having a different wavelength. Couplers 14A-14D send a portion of each of the laser pulses having a different wavelength to a multiplexer 16 which combines the laser pulses into a single multi-wavelength pulse which is then modulated by an acousto-optic modulator (herein abbreviated AOM) 18 to form a probe signal, shown as signal 20. The probe signal is amplified by an erbium-doped fiber amplifier (herein abbreviated EDFA) 22 which is then sent to a circulator 24, which sends signal 20 to a first optical fiber under test 26A and a second optical fiber under test 26B. A piezoelectric transducer 28 is used to generate a disturbance (not shown) between first and second optical fibers under test 26A and 26B. Backscatter signals return to circulator 24 which then sends the backscattered signals to demultiplexer 30. As shown, demultiplexer 30 is coupled with a plurality of couplers 14E-14H. Coupler 14A is coupled with coupler 14E, coupler 14B is coupled with coupler 14F, coupler 14C is coupled with coupler 14G and coupler 14D is coupled with coupler 14H. Each one of plurality of couplers 14A-14D also sends a portion of each of the laser pulses having a different wavelength to a respective one of plurality of couplers 14E-14H as a respective reference signal. Demultiplexer 30 separates out backscattered signals according to wavelength, passing on each of the different wavelengths of the backscattered signals to a different one of plurality of couplers 14E-14H. As shown, each one of plurality of couplers 14E-14H is respectively coupled with one of a plurality of photodetectors 32A-32D. Each one of plurality of photodetectors 32A-32D is a balanced photodetector, and provides a detected signal from the backscattered signals and from the reference signals to a processor 34, which can then be used to determine the location of the disturbance in first and second optical fibers under test 26A and 26B. In the DAS system of Gu et al., N laser sources along with N balanced photodetectors are used in order to detect N different wavelengths, to be used to determine the location of a disturbance in an optical fiber. Where such a DAS system enables an increase in frequency bandwidth which can increase the channel capacity of each wavelength used for detection, such a DAS system is expensive and complex due to the use of multiple laser sources as well as the required correspondence between laser sources and balanced photodetectors needed to generate and to detect a multi-wavelength signal.

What is needed is a method and system for real-time DAS sensing over fiber optics using multi-frequency pulses having high SNR over the prior art for real-time sensing over long distances of optical fiber which overcomes and addresses all the challenges presented above, including the issues of Rayleigh fading and the non-linearity of the phase of the backscattered signals.

SUMMARY OF THE DISCLOSED TECHNIQUE

The disclosed technique overcomes the disadvantages of the prior art by providing a novel system and method for improving the SNR and linearity in real-time DAS systems using multi-frequency signals. According to an aspect of the disclosed technique there is thus provided a DAS system for quasi-coherent detection of at least one multi-frequency signal over an optical fiber. The DAS system includes a multi-frequency pulse generator, a circulator, a coherent detector and a processor. The circulator is coupled with the multi-frequency pulse generator and the optical fiber. The coherent detector is coupled with the circulator and with the multi-frequency pulse generator and the processor is coupled with the coherent detector. The multi-frequency pulse generator is for generating at least one multi-frequency pulse train including at least two pulses each having a different frequency, the multi-frequency pulse train including a plurality of carriers. The coherent detector is for receiving at least one backscattered signal from the optical fiber and the processor is for quasi-coherent aggregation of the carriers in the backscattered signal. The processor channelizes the backscattered signal into at least one complex signal for each frequency in the carriers. For each complex signal, the processor respectively extracts at least one of an amplitude change and a phase change for each one of the carriers and selectively aggregates at least one of the amplitude change and the phase change for the carriers for determining if an event has occurred over the optical fiber. The selective aggregation is executed according to respective carrier noise in each one of the carriers and is weighted to maximize at least one of an SNR and a linearity of the complex signal.

According to another aspect of the disclosed technique there is thus provided a method for DAS for quasi-coherent detection of at least one multi-frequency signal over an optical fiber. The method includes the procedures of generating at least one multi-frequency pulse train including at least two pulses each having a different frequency, with the multi-frequency pulse train including a plurality of carriers, and receiving at least one backscattered signal from the optical fiber. The method also includes the procedures of channelizing the backscattered signal into at least one complex signal for each frequency in the carriers and selectively aggregating the carriers in the backscattered signal for determining if an event has occurred over the optical fiber. The procedure of selectively aggregating the carriers includes the sub-procedures of respectively extracting at least one of an amplitude change and a phase change for each one of the carriers for each complex signal and aggregating and weighting each one of the carriers according to respective carrier noise for maximizing at least one of an SNR and a linearity of the complex signal.

BRIEF DESCRIPTION OF THE DRAWINGS

The disclosed technique will be understood and appreciated more fully from the following detailed description taken in conjunction with the drawings in which:

FIG. 2A is a schematic illustration of incoherent detection of a multi-frequency backscattered signal, constructed and operative in accordance with a development of the disclosed technique;

FIG. 2B is a schematic illustration of coherent detection of a multi-frequency backscattered signal, constructed and operative in accordance with another development of the disclosed technique;

FIG. 4 is a schematic illustration of a multi-frequency DAS system using quasi-coherent detection, constructed and operative in accordance with a further embodiment of the disclosed technique;

FIG. 5 is a schematic illustration of a quasi-coherent detection method of a multi-frequency backscattered signal, constructed and operative in accordance with another embodiment of the disclosed technique;

DETAILED DESCRIPTION OF THE EMBODIMENTS

Figure 1:
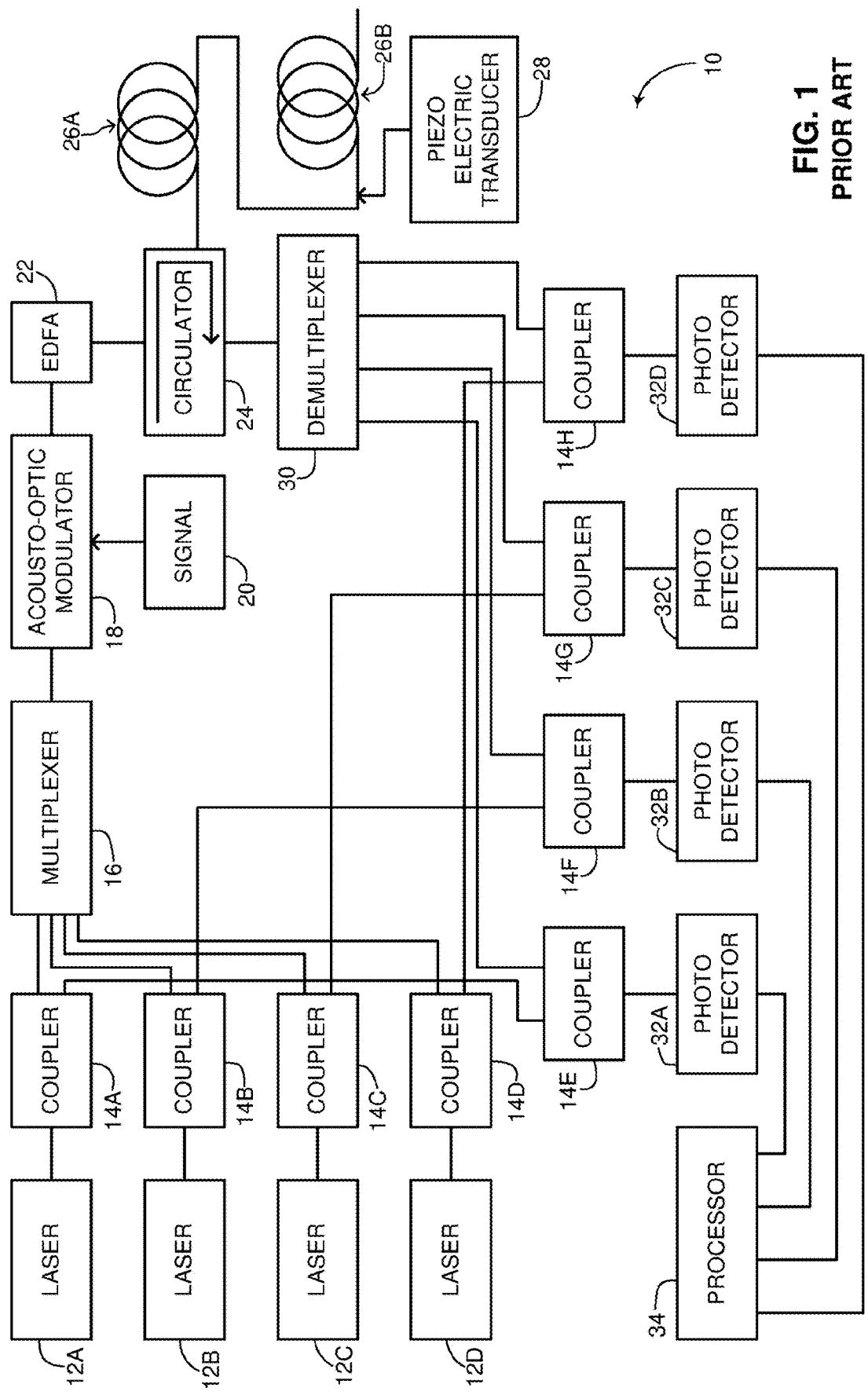
FIG. 1 is a schematic illustration of a DAS system using a multi-wavelength signal over fiber optics, as is known in the prior art.

The disclosed technique overcomes the disadvantages of the prior art by providing a novel method and system for real-time DAS sensing over fiber optics using a quasi-coherent detection of multi-frequency backscattered signals. The disclosed technique thus provides a solution for addressing all four challenges presented in the background section above. The method and system of the disclosed technique relates to any one of real-time DAS analysis, detection, event classification, alerting and decision taking based on a sensed and/or detected event on a fiber optic. The inherent high SNR of the disclosed technique thus allows for real-time DAS sensing over long distances with an extremely low false alarm rate (herein abbreviated FAR). In general, false alarms result from two major causes, poor SNR (which can lead to situations where noise is interpreted as an event) and incorrect classification. The use of multi-frequency signals according to the disclosed techniques allows for an increase in SNR thus substantially eliminating occurrences of noise being interpreted as an event. Multi-frequency signals also enable true tracking of the wavefront as it propagates along the length of a fiber optic without issues of non-linearities, thus enabling improved classification of events that result in a reduction in FAR. The novel method and system achieve high SNR thus enabling real-time DAS over long distance fiber optics (i.e., greater than 50 km). The novel method and system of the disclosed technique not only achieves high SNR but also an SNR of the measured phase differences of the backscattered signals which remains high and stable for long distances, such as between 50-100 km. Prior art DAS sensing systems do achieve good initial SNR however the SNR begins to fade after short distances (such as around 15 km). In the disclosed technique, as detailed below, a multi-frequency signal is introduced into a fiber optic having a high level of energy while nonetheless keeping the power of the signal below the threshold of non-linear effects. Thus, according to the disclosed technique, a very stable SNR of the phase of the backscattered signals can be achieved for long distances without significant fading and also without the occurrence of non-linear effects in the fiber optic. The disclosed technique suggests the use of multi-frequency light pulses for an increase in the energy of the transmitted light without increasing the power (and thus avoiding any non-linear phenomena in the backscattered signals), by timing the delays of the different pulses as not to overlap, thus being effective for long-distance DAS systems wherein the signal is greatly attenuated, both in the forward propagation, and the backscattered propagation back to the detector and therefore addressing challenge (1) as presented above. The disclosed technique overcomes the issues of Rayleigh fading and also provides a solution for the tradeoff between the energy of the backscattered signals and the achievable spatial resolution (presented above as challenge (3)).

The system of the disclosed technique consists of a novel multi-frequency generator, a coherent receiver and a processor for quasi-coherent detection. The disclosed technique overcomes inherent and frequency dependent phase Rayleigh noise by a novel quasi-coherent detection method for aggregating the different frequencies of the multi-frequency backscattered signals thus addressing challenge (2). The disclosed technique can support DAS in long distance applications, for example in fiber optics which are laid over a distance of at least 50 km. Furthermore, the disclosed technique overcomes the issue of non-linearity in the phase of the backscattered signals by using a novel method of quasi-coherent detection which compensates for the non-linearity of the phase of the backscattered signals thus addressing challenge (4). The disclosed technique overcomes the tradeoff issue of high spatial resolution and the energy of the backscattered signals by transmitting a variety of multi-frequency pulses wherein some of the pulses are long thus providing a high SNR and wherein some of the pulses are short thus providing improved spatial resolution thus addressing challenge (3).

According to the disclosed technique a novel real-time quasi-coherent detection method for use in a DAS system is described having the following main procedures. After transmitting a multi-frequency signal along a fiber, backscattered signals are received by a balanced optical coherent receiver. The multi-frequency signal includes a multi-frequency pulse train wherein each pulse in the pulse train has a different frequency. A received backscattered signal is then channelized to the different frequency components, and according to some embodiments is also separated into different polarization components (which can be referred to as channels), thus digitally separating each backscattered signal at each frequency and in some embodiments at each polarization. The result of the channelization yields a complex signal for each frequency in the backscattered signal. Once a separation procedure is performed according to the different frequencies of the transmitted multi-frequency light pulse, each channel can be processed separately. The processing can include the extraction of at least one of amplitude information and phase information, including the extraction of the phase change at each frequency. Unlike the prior art however, after each channel is processed, a novel aggregation of the information from the channels is performed wherein relevant information from at least some of the channels is extracted and aggregated. The aggregation can include, for example, a summation of all the phase changes in each of the carriers, weighted by amplitude, to create a single phase change map based on all the different frequencies. Based on the aggregation, a procedure of detection and event decision can then be made. In addition, the architecture of the system of the disclosed technique allows for a signal with very high energy to be transmitted, however without resulting in non-linear effects, thereby enabling long-range sensing and detection. Furthermore, the novel aggregation enables the issue of the non-linearity of the phase changes in a backscattered signal to be mitigated.

As described above, according to the disclosed technique, a quasi-coherent detection technique of multi-frequency carriers can be used to increase the SNR of DAS systems over fiber optics. In addition to overcoming Rayleigh fading, the SNR of the disclosed system using K carriers is increased and improved by a square root magnitude of $\sqrt{K}$ in relation to a single carrier map due to the diversity in the random phase of the carriers. Performing this novel processing using a processor enables real-time processing of a 50 km or longer fiber sampled at 1 KHz and enables simple changing of parameters such as the number of carriers, pulse width and duration in order to control the spatial resolution of the DAS system of the disclosed technique.

As mentioned in the background section, in the DAS system of Gu et al., N laser sources along with N balanced photodetectors are used in order to detect N different frequencies, to be used to determine the location of a disturbance in an optical fiber. However, the use of a plurality of laser sources in such a DAS system leads to a lack of fixed phase relationships between the different generated frequencies, thus requiring a more complex system and calculation to determine the phase changes in the backscattered signal. The disclosed technique differs from the DAS system of Gu et al. in at least three different ways. First, in the disclosed technique, only a single laser source is used to generate a multi-frequency signal. As described below, the multi-frequency signal can be generated using an acousto-optic modulator, an electro-optic modulator or a loop structure. Thus according to the disclosed technique there is only one initially generated frequency, and using a series of frequency shifts, a multi-frequency signal is generated from the initially generated frequency. The generated multi-frequency signal thus comprises a plurality of carriers having the same wavelength source yet with different frequency modulations. Second, as the different carriers all have the same wavelength source there is a fixed phase relationship between the different generated carriers, thus leading to a simpler and easier aggregation of the phase changes in the backscattered signal according to the quasi-coherent detection method of the disclosed technique (as compared to the DAS system of Gu et al.,). This novel aggregation enables real-time determining of events and disturbances over an optical fiber over long distances of at least 50 km or longer. Third, in the system of Gu et al., a plurality of balanced photodetectors is used which generates a dependence on the bandwidth of the plurality of photodetectors. In the disclosed technique, only a single balanced coherent detector is required, thereby allowing for an independence of the bandwidth of the detector.

As described above, the disclosed technique relates to a novel method for analyzing multi-frequency backscattered signals which has been named quasi-coherent detection. The name is taken from two general known terms in signal processing which are "coherent integration" and "incoherent integration". In the development of the disclosed technique, the inventors experimented with the use of both coherent integration and incoherent integration in DAS systems over fiber optics and arrived at quasi-coherent integration which combines aspects of both coherent integration and incoherent integration. As discovered by the inventors, both incoherent integration (i.e., detection) and coherent integration (i.e., detection) with multi-frequency signals can be used in DAS systems however each method comes with its own limitations. It is noted that the terms "coherent integration" and "coherent detection" are used interchangeably and that the terms "incoherent integration" and "incoherent detection" are also used interchangeably. Since multi-frequency pulses include a plurality of carriers, a summation or aggregation of sorts is required to combine the backscattered signals coming from each of the carrier signals of the transmitted multi-frequency pulse. In order to better present the disclosed technique, the methods of coherent detection and incoherent detection are presented herein.

Reference is now made to FIGS. 2A and 2B, which are respectively schematic illustrations of incoherent detection of a multi-frequency backscattered signal and coherent detection of a multi-frequency backscattered signal, generally referenced 50 and 70, constructed and operative in accordance with a development and another development of the disclosed technique. With reference to FIG. 2A, an incoherent detection method of a multi-frequency backscattered signal is shown, from transmission to detection and decision. Before transmission, a multi-frequency signal is generated (not shown) using a plurality of carriers, wherein each frequency of the multi-frequency signal is assigned to a different channel and is then transmitted along an optical fiber. Backscattered signals, with data from all the channels (assuming K channels were used for the multi-frequency signal), are then analyzed. The data may be an optical signal in which case the process of channelization (as described below) may be executed using a demultiplexer (not shown). In another case, the optical signal is received by a receiver (not shown), and arrow 52 describes a digitally sampled signal. Each received backscattered signal S includes data from all the channels. The received data from all the channels is then separated into their respective channels through a procedure of channelization 54, which might include a short-time Fourier transform (herein abbreviated STFT) or other kinds of digital channelization. Ideally, channelization 54 separates the data into K channels without any cross-talk, meaning each channel includes only data from the backscattered light of carrier k with frequency $\omega_k$. In incoherent detection a matched filter $T_k$ is defined for each carrier k, such that a separate determination for each carrier can be defined as follows:

$$S = S1 + S2 + \ldots S_K \rightarrow S^*T_1, S^*T_2, \ldots, S^*T_K \rightarrow |S_1|^2, |S_2|^2, \ldots, |S_K|^2 \quad (1)$$

As shown, after channelization, each channel is processed separately as a first processed channel $56_1$, a second processed channel $56_2$, a third processed channel $56_3$ and the like until a $K^{th}$ processed channel $56_K$. The processing of each channel may include shifting and other mathematical operations as well as the extraction of phase information and/or amplitude information about each channel. Based on the processing of each channel, a determination is made per channel if an event has been detected over the channel or not. Thus for each channel, a respective channel detection is performed, shown as a channel 1 detection $58_1$, a channel 2 detection $58_2$, a channel 3 detection $58_3$ and a channel K detection $58_K$. Since multiple frequencies are used in such a detection it may be the case that some channels will return a detected event whereas other channels will not. For example, on channels 1 and 3 an event may be detected but on channel 2 an event is not detected. The results of the detections over all the channels are combined together to make a statistical decision if an event occurred or not, as shown by an event decision 60. Incoherent detection thus allows for separate detections and determinations for each carrier of the multi-frequency signal which can be combined to make an event decision. However incoherent detection does not increase the SNR as much as other methods.

With reference to FIG. 2B, a coherent detection method of a multi-frequency backscattered signal is shown, from transmission to detection. Similar to FIG. 2A, before transmission, a multi-frequency signal is generated (not shown), wherein each frequency of the multi-frequency signal is assigned to a different channel via a plurality of carriers. Backscattered signals of the multi-frequency signal are received by a receiver (not shown). As shown by an arrow 72, a backscattered signal includes data from all the channels. Instead of separating the backscattered signal according to channel by a process of channelization, the data from all the channels are treated and manipulated jointly. As shown in FIG. 2B, a single matched filter T is assumed for the whole pulse train of received backscattered signal S. Thus, as shown, a procedure of match filtering 74 is applied to the received backscattered signal. Match filtering 74 generates a single channel of the received backscatter signal which can be processed as shown by a channel processing 76. The structure of the matched filter is such that it is designed to create constructive interference of the backscattered signals at different frequencies, leading in general to an increase in the SNR as compared to the combining in incoherent detection. Channel processing 76, as mentioned above, can include various mathematical operations as well as the extraction of phase information and/or amplitude information about the signal. Since only a single channel is processed, after the processing in channel processing 76, a procedure of channel detection and event decision 78 is performed. Mathematically, the summation in coherent detection can be defined as $S*T$. Even though such a formulation can lead to a high SNR, different scattering coefficients for the different frequencies can ruin the intended constructed interference, thereby increasing the noise, and ultimately reducing the total SNR. In general, the improvements in SNR in a coherent detection system are much higher than in an incoherent detection system. However in real-world applications of DAS systems using coherent detection, the different scattering coefficients for the different carriers may destroy the constructive interference, and thereby reduce the SNR improvement completely.

As mentioned above, methods for separating out information from received backscattered signals of a multi-frequency pulse can include incoherent detection and coherent detection and according to the disclosed technique can be used in DAS systems, albeit with certain limitations. In incoherent integration, each backscattered signal (i.e., either defined as a carrier, a frequency component or a pulse) is measured separately. Thus, in a DAS system using multi-frequency carriers, amplitude changes in the backscattered signals of each carrier can be measured and a detection of events can be executed based on the changes in amplitude detected. Measurements of the amplitudes of the different carriers however does not significantly improve the SNR of the backscattered signals as compared to single carrier detection because the backscattered signal is different for each carrier, and both the signal and the noise are uncorrelated and are added in a similar manner. In addition, a summation of the amplitudes resulting from backscattered signals of different frequencies does not reduce Rayleigh noise since the backscattered signals are not linear in their disturbances. The article to Zahibi et al. can be viewed as resembling incoherent detection, in which each channel is analyzed separately, and yields a phase difference measurement. In that article, the combined phase difference is chosen to be the one with the highest average amplitude.

In the case of coherent detection, the backscattered signals from each of the carriers are measured coherently before any analysis is performed. Thus, a single matched filter is applied to the backscattered signals from the entire transmitted pulse train of the multi-frequency signal and then a single analysis can be performed for the filtered backscattered signals. Coherent detection can usually lead to an improvement in the spatial resolution and to a linear improvement in SNR as the number of carriers increase. However, coherent summation depends on constructive interference between the different carriers. Since the backscattered signal has a different amplitude and more importantly a different phase for each of the different carriers, as explained later in Equation (10), the constructive interference is cancelled, thereby leading to a signal that does not improve much with an increase in the number of carriers. Since a single matched filter is used to combine all the different carriers of the received backscattered signals, it is assumed in coherent detection that the different carriers will essentially respond the same under the single matched filter. However, such an assumption cannot be guaranteed in all situations and scenarios. In laboratory setting, which might use localized piezoelectric stretchers that change the strain in a single measurement cell, without applying strain to the locations from which the phase of the backscattered signal is extracted, coherent detection may indeed increase the spatial and temporal resolution of the detection in DAS systems. However, in real-life scenarios, because of the presence of constant events over an optical fiber that will cause strain and stress over various locations over the fiber, the phases of the backscattered signal will almost always change with strain, and cancel the constructive interference required for coherent detection. As described in further detail below, the disclosed technique utilizes a detection method of quasi-coherent detection (or quasi-coherent integration) in which certain elements of incoherent integration are used whereas other elements of coherent integration are used.

Figure 2C:
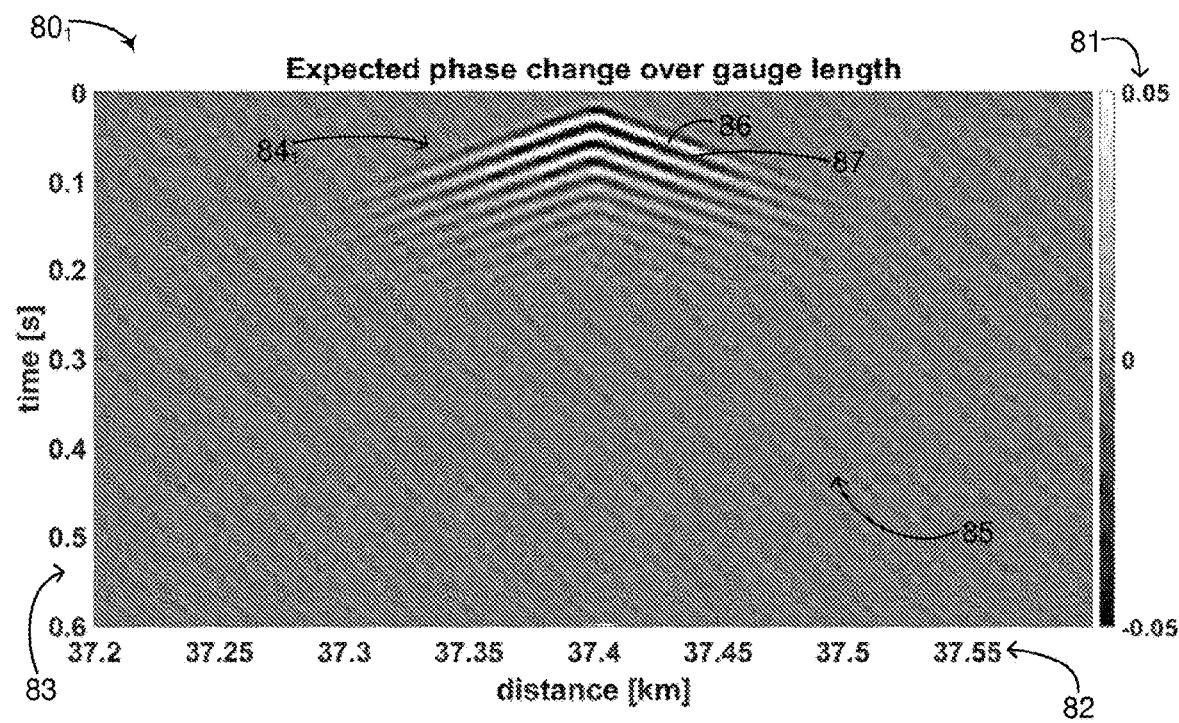
FIG. 2C is a graph of the phase change over time of the expected phase change of a simulation of an event over a fiber optic, constructed and operative in accordance with a further development of the disclosed technique.

Reference is now made to FIG. 2C which is a graph of the phase change over time of the expected phase change of a simulation of an event over a fiber optic, generally referenced 80₁, constructed and operative in accordance with a further development of the disclosed technique. Graph 80₁ includes an X-axis 82 which shows distance in km over a fiber optic and a Y-axis 83 which shows time in seconds. The right-hand side of graph 80₁ includes a hue scale 81 ranging from 0.05 (white) to −0.05 (black), in units of radians, representing changes in the phase of a signal. Values above 0.05 radians are displayed as white, and values below −0.05 radians are displayed as black. Given a simulation of an event over a fiber optic wherein an event is to occur at 37.4 km, graph 80₁ represents the expected (and thus ideal) phase change to be detected by a receiver (not shown) via backscattered signals. The event is represented by reference number 84₁ wherein alternating lines of white and black show the ideal and expected phase changes of the event. As shown, a smooth white line 86 and a smooth black 87 are shown one on top of the other representing phase changes from 0.09 to −0.09 radians whereas a background 85 shows no phase changes at all and is thus at a hue of grey representing 0 radians. Graph 80₁ will be used to compare the disclosed technique of quasi-coherent integration as compared to coherent integration and incoherent integration while also showing the differences that occur by increasing the number of carriers in the multi-frequency pulse.

Figure 2D:
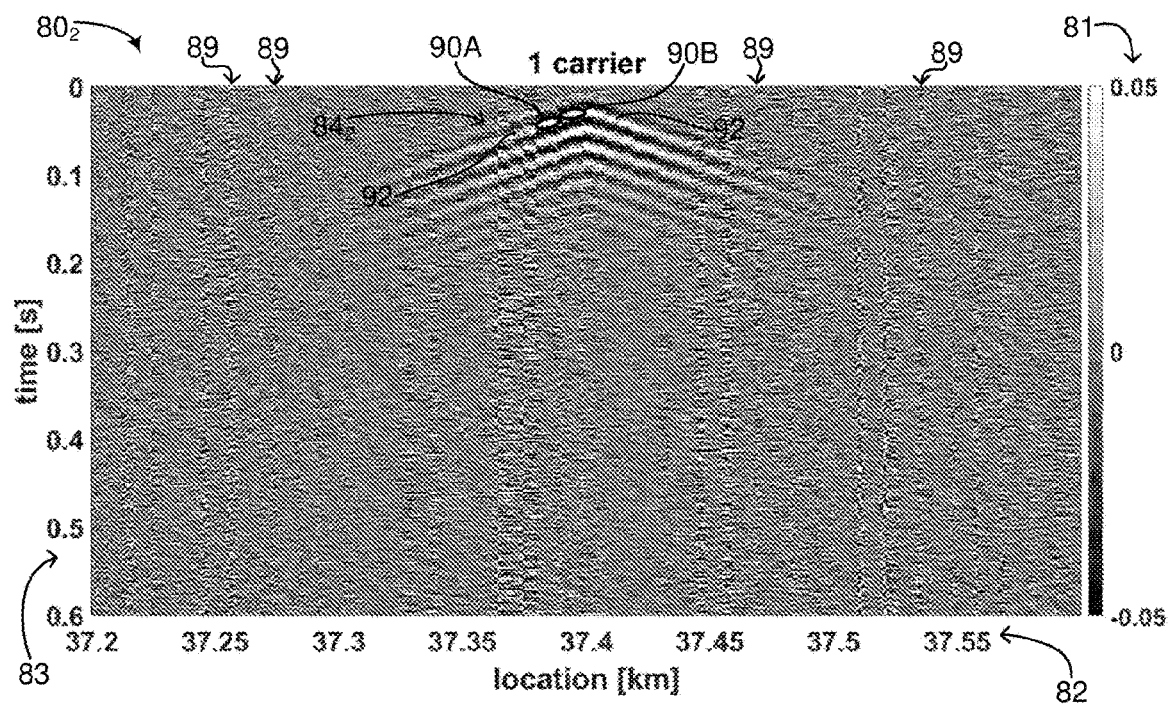
FIG. 2D is a graph of the phase change over time of the phase change of a simulation of an event over a fiber optic using a detection method wherein a single carrier pulse was transmitted, constructed and operative in accordance with another development of the disclosed technique.

Reference is now made to FIG. 2D, which is a graph of the phase change over time of the phase change of a simulation of an event over a fiber optic using a detection method wherein a single carrier pulse was transmitted, generally referenced 802, constructed and operative in accordance with another development of the disclosed technique. FIG. 2D similarly shows a graph having an X-axis 82 representing distance in km, a Y-axis 83 representing time in seconds and a hue scale 81 representing changes in phase in radians. These axes and scales are identical to the axes and scales shown in FIG. 2C. Graph 802 represents a typical DAS single carrier pulse. Transmitted and backscattered signals from the single carrier pulse may further be used to detect an event $84_2$. As can be clearly seen, graph $80_2$ exhibits two types of noise. A plurality of lines 89 are visible and represent Rayleigh fading whereas offset circles 90A and 90B showing a slight offset on a white line 92 represent the non-linearity of the phase of a backscattered signal, which as described above can be considered a source of noise, as shown below in component (b) in Equation (9). Rayleigh fading, as described above, occurs when destructive interference occurs between backscattered signals, thus resulting in backscattering cells of decreased backscattered power along the fiber optic. Thus, each of plurality of lines 89 represents a backscattering cell in the fiber optic where Rayleigh fading has occurred. The smoothness of white line 92 (as well as the other lines representing the phase changes of the event) has been lost as compared to white line 86 (FIG. 2C). This is due to the non-linearity of the phase of the backscattered signals which are shown to be different over different distances. As shown, the phase change at the distance of offset circle 90A is different than the phase change at the distance of offset circle 90B. It is noted that even though event $84_2$ appears to be visible this is due to the noise threshold in graph $80_2$ being very low. If the noise threshold was raised, event $84_2$ may not be visible at all and would simply be written off as noise over the fiber optic. As can be seen as well, Rayleigh noise permeates the background of graph $80_2$ and is present over a period of time. Typical variations of Rayleigh fading are tens of seconds. The non-linearity of the phase changes however are much more localized both in distance and in time since they strongly depend on the local strain.

Figure 2E:
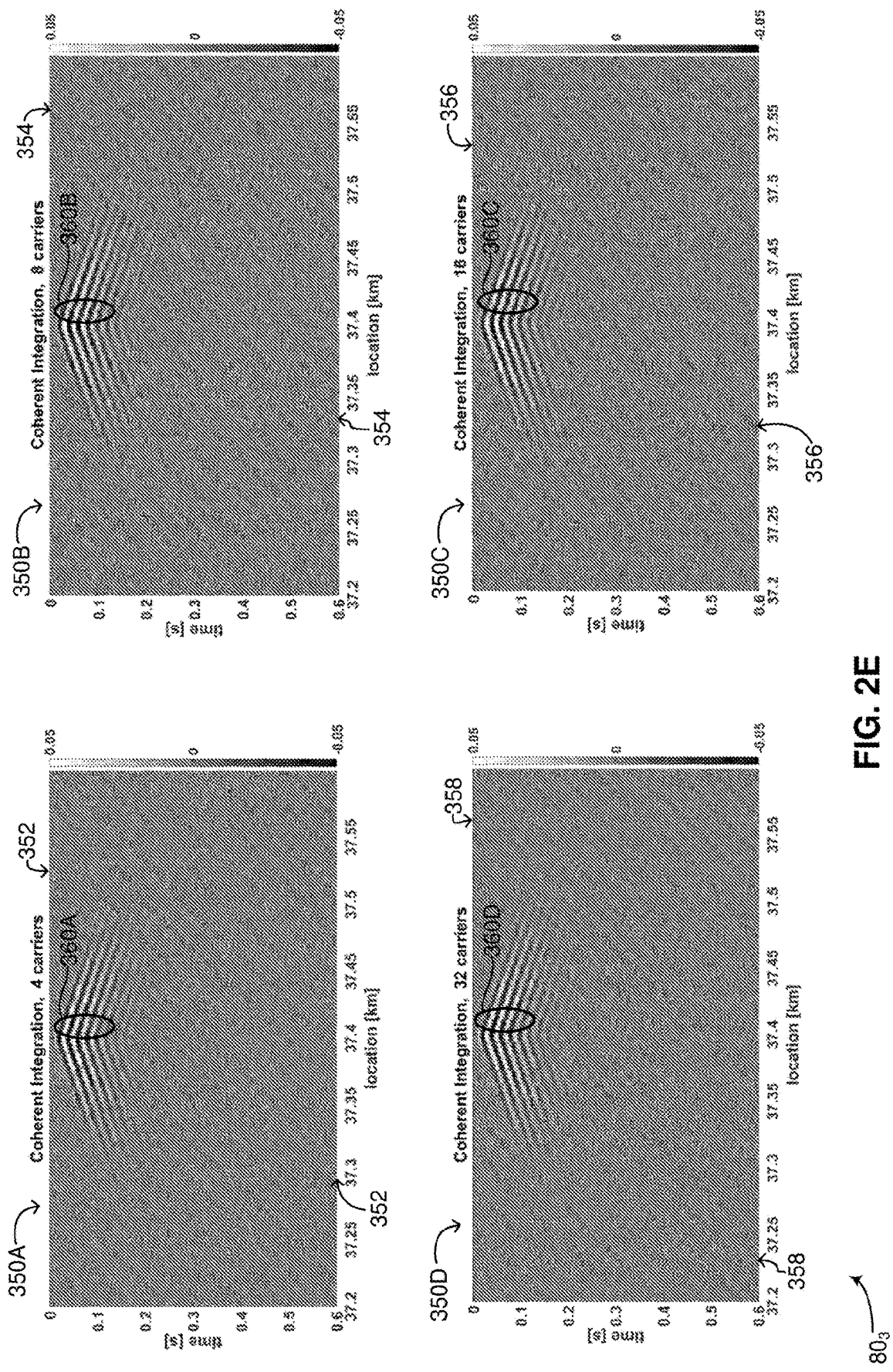
FIG. 2E is a set of graphs of the change over time of the phase change of a simulation of an event over a fiber optic using a coherent integration method with a multi-frequency pulse having 4, 8, 16 and 32 different carriers, constructed and operative in accordance with a further development of the disclosed technique.

Reference is now made to FIG. 2E, which shows a set of graphs of the change over time of the phase change of a simulation of an event over a fiber optic using a coherent integration method with a multi-frequency pulse having 4, 8, 16 and 32 different carriers, generally referenced $80_3$, constructed and operative in accordance with a further development of the disclosed technique. The axes and scales (not labeled) of the graphs shown in FIG. 2E are identical to the graphs shown in FIGS. 2C and 2D in order to make a visual comparison simpler. Shown is the phase change of a backscattered multi-frequency signal using a coherent integration method wherein the multi-frequency signal has different numbers of carriers. A first graph 350A shows the phase changes of an event (not labeled) using 4 carriers in the multi-frequency signal, a second graph 350B shows the phase changes of an event (not labeled) using 8 carriers in the multi-frequency signal, a third graph 350C shows the phase changes of an event (not labeled) using 16 carriers in the multi-frequency signal and a fourth graph 350D shows the phase changes of an event (not labeled) using 32 carriers in the multi-frequency signal. As can be seen Rayleigh fading is present in all graphs, even when the number of carriers in coherent integration is increased. This is because in coherent integration, the signal is an interference of all carriers and there is no diversity between the different carriers. Thus, Rayleigh fading will always be present when using coherent integration. In addition, there is no substantial improvement in the linearity of the phase changes of the event as the number of carriers increases, shown by ovals 360A, 360B, 360C and 360D. For example, a comparison of oval 360D to 360C shows that the phase lines (the white and black lines shown in the graphs) are present in both.

Figure 2F:
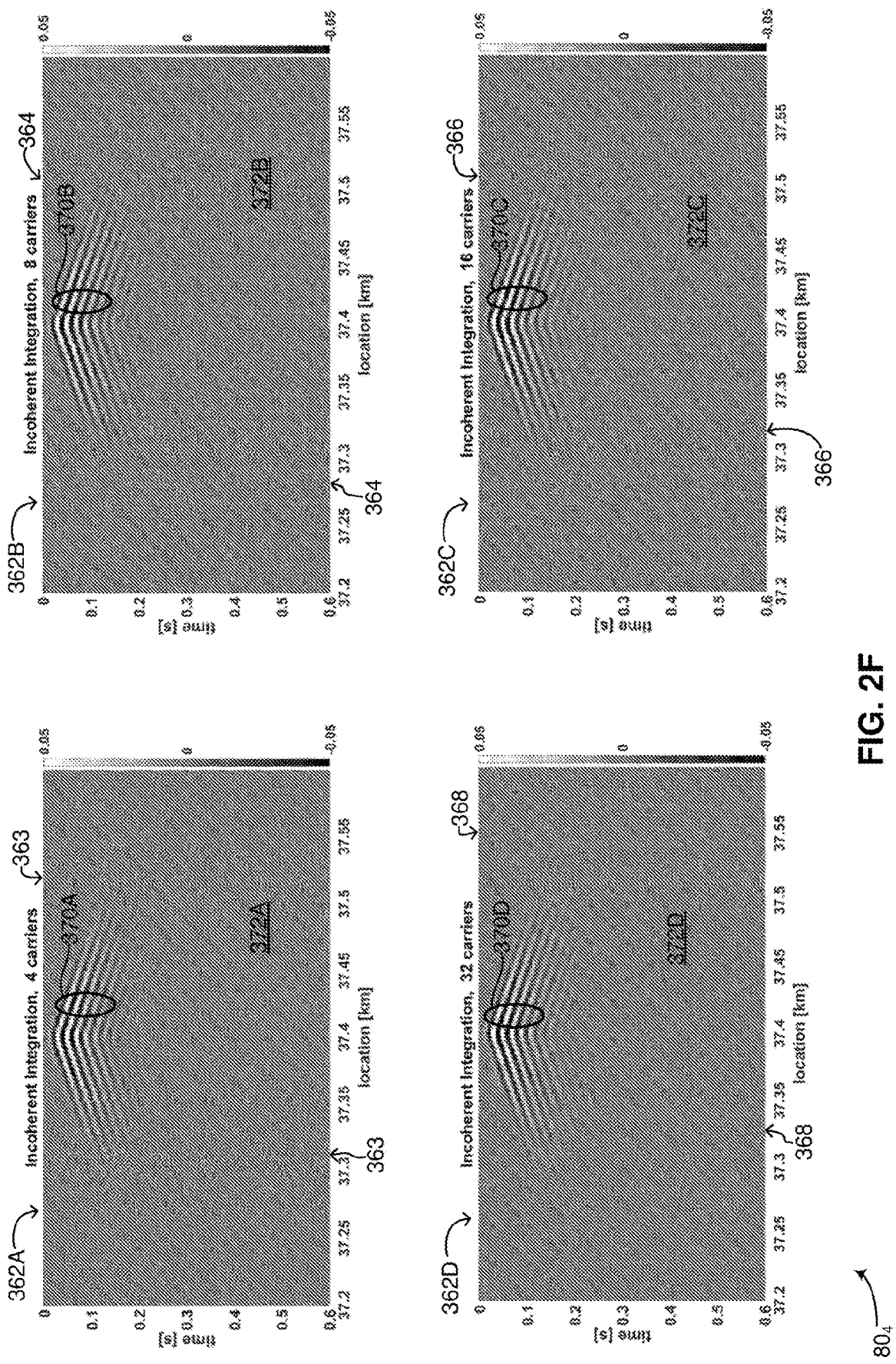
FIG. 2F is a set of graphs of the change over time of the phase change of a simulation of an event over a fiber optic using an incoherent integration method with a multi-frequency pulse having 4, 8, 16 and 32 different carriers, constructed and operative in accordance with another development of the disclosed technique.

Reference is now made to FIG. 2F, which is a set of graphs of the change over time of the phase change of a simulation of an event over a fiber optic using an incoherent integration method with a multi-frequency pulse having 4, 8, 16 and 32 different carriers, generally referenced $80_4$, constructed and operative in accordance with another development of the disclosed technique. In order to compare the incoherent case shown in FIG. 2F to the coherent case shown in FIG. 2E and quasi-coherent case shown below in FIG. 2G, event decision 60 (FIG. 2A) as chosen regarding FIG. 2F is the determination of the phase differences of the carrier with the largest average amplitude. The axes and scales (not labeled) of the graphs shown in FIG. 2F are identical to the graphs shown in FIGS. 2C and 2D in order to make a visual comparison simpler. Shown is the phase change of a backscattered multi-frequency signal using an incoherent integration method wherein the multi-frequency signal has different numbers of carriers. A first graph 362A shows the phase changes of an event (not labeled) using 4 carriers in the multi-frequency signal, a second graph 362B shows the phase changes of an event (not labeled) using 8 carriers in the multi-frequency signal, a third graph 362C shows the phase changes of an event (not labeled) using 16 carriers in the multi-frequency signal and a fourth graph 362D shows the phase changes of an event (not labeled) using 32 carriers in the multi-frequency signal. As can be seen in comparison to both the graphs in FIG. 2E as well as the graph in FIG. 2D, a significant visual improvement in the amount of Rayleigh fading is seen, shown as lines 363, 364, 366 and 368 as the number of carriers increases. Whereas a bit of Rayleigh fading is visible in first graph 362A, Rayleigh fading is barely visible in fourth graph 362D. In incoherent detection, the diversity of the multi-frequency signal is taken into account, as carriers with the least amount of Rayleigh fading are chosen. Thus, the greater the number of carriers, the less Rayleigh fading is visible in the phase change. This is also visible based on the backgrounds 372A, 372B, 372C and 372D of each of the graphs, wherein background 372D hardly exhibits any Rayleigh fading, whereas background 372A does exhibit Rayleigh fading that is visible. However, the improvement in the linearity of the phase changes of the event as the number of carriers increases is small, as shown by ovals 370A, 370B, 370C and 370D.

Figure 2G:
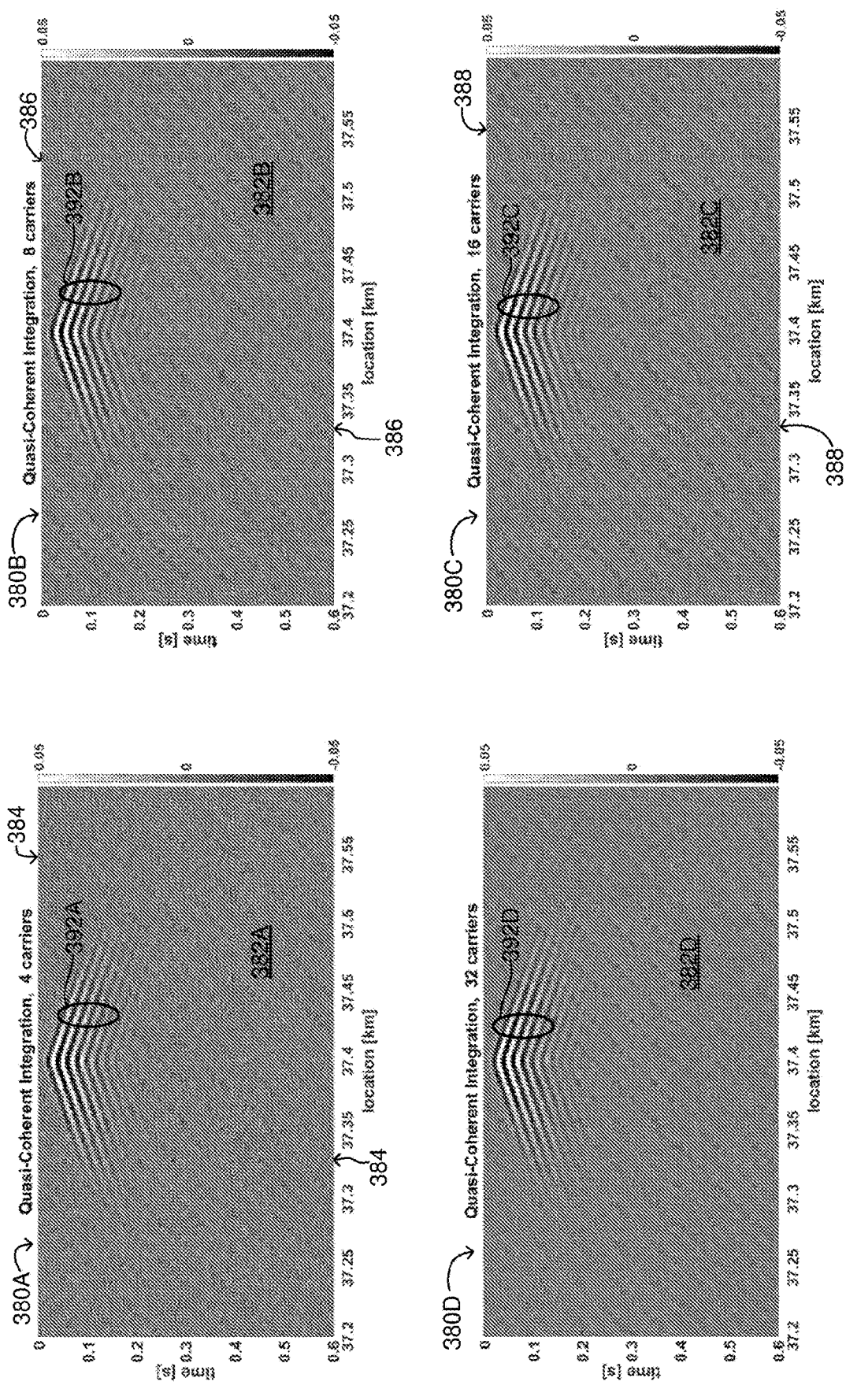
FIG. 2G is a set of graphs of the change over time of the phase change of a simulation of an event over a fiber optic using a quasi-coherent integration method with a multi-frequency pulse having 4, 8, 16 and 32 different carriers, constructed and operative in accordance with an embodiment of the disclosed technique.

As described above, the quasi-coherent integration of the disclosed technique utilizes the diversity of the backscattered multi-frequency signal in separating and processing each of the channels of the carriers of the backscattered signal while also aggregating the processed data from each of the channels. As a comparison to FIGS. 2E and 2F and also to the expected phase change as shown in FIG. 2C, reference is now made to FIG. 2G, which is a set of graphs of the change over time of the phase change of a simulation of an event over a fiber optic using a quasi-coherent integration method with a multi-frequency pulse having 4, 8, 16 and 32 different carriers, generally referenced $80_5$, constructed and operative in accordance with an embodiment of the disclosed technique. The axes and scales (not labeled) of the graphs shown in FIG. 2G are identical to the graphs shown in FIGS. 2C and 2D in order to make a visual comparison simpler. Shown is the phase change of a backscattered multi-frequency signal using the quasi-coherent integration method of the disclosed technique wherein the multi-frequency signal has different numbers of carriers. A first graph 380A shows the phase changes of an event (not labeled) using 4 carriers in the multi-frequency signal, a second graph 380B shows the phase changes of an event (not labeled) using 8 carriers in the multi-frequency signal, a third graph 380C shows the phase changes of an event (not labeled) using 16 carriers in the multi-frequency signal and a fourth graph 380D shows the phase changes of an event (not labeled) using 32 carriers in the multi-frequency signal. As can be seen in comparison to both the graphs in FIGS. 2E and 2F as well as the graph in FIG. 2D, the quasi-coherent method shows the greatest visual improvement in the amount of Rayleigh fading seen, shown as lines 384, 386 and 388 as the number of carriers increases. As shown, no Rayleigh fading is visible in fourth graph 380D, which almost resembles the expected (i.e., ideal) phase change as shown above in FIG. 2C. In quasi-coherent detection, the diversity of the multi-frequency signal is taken into account by properly weighing the contribution of each channel. Thus, the greater the number of carriers, the less Rayleigh fading is visible in the phase change. This is also visible based on backgrounds 382A, 382B, 382C and 382D of each of the graphs, wherein background 382D does not exhibit any Rayleigh fading visible to the eye, whereas background 382A does exhibit some Rayleigh fading that is visible. In addition, there is a significant improvement in the linearity of the phase changes of the event as the number of carriers increases, shown by ovals 392A, 392B, 392C and 392D. The non-linearity of the phase changes in oval 392A are visible whereas as the number of carriers increases, the phase lines get progressively smoother. Already by 16 carriers, the phase lines are very smooth and almost resemble the phase lines in FIG. 2C. 32 carriers improves the smoothness of the phase lines to the point that graph 380D appear to be substantially similar to graph $80_1$. This is due to the coherent addition of component (a) together with the incoherent averaging of component (b) in Equation (9).

Figure 3A:
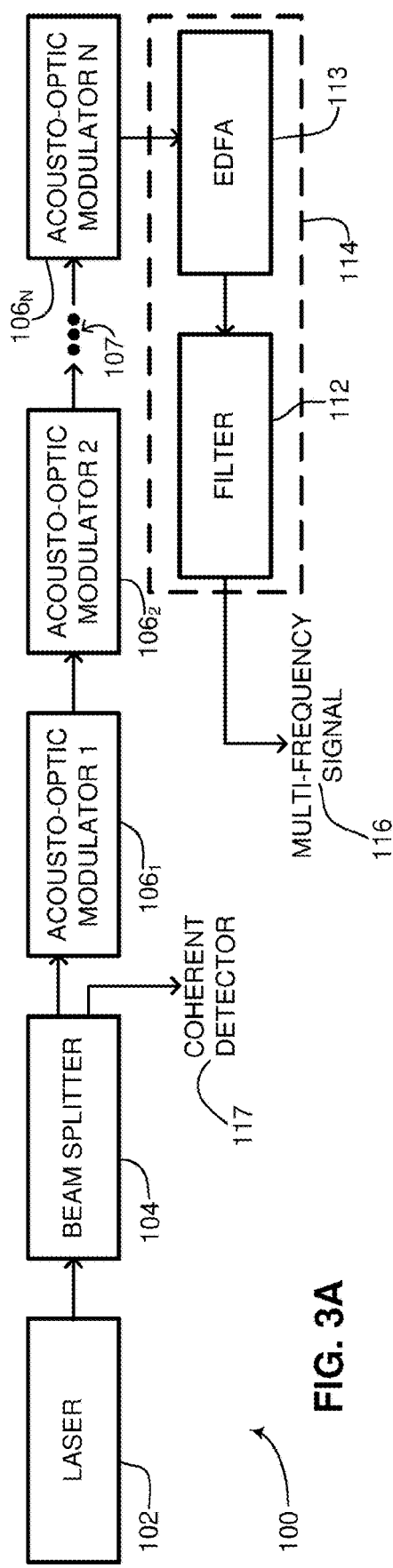
FIGS. 3A and 3B are schematic illustrations of different embodiments of a multi-frequency optical pulse generator, constructed and operative in accordance with another embodiment of the disclosed technique.
Figure 3B:
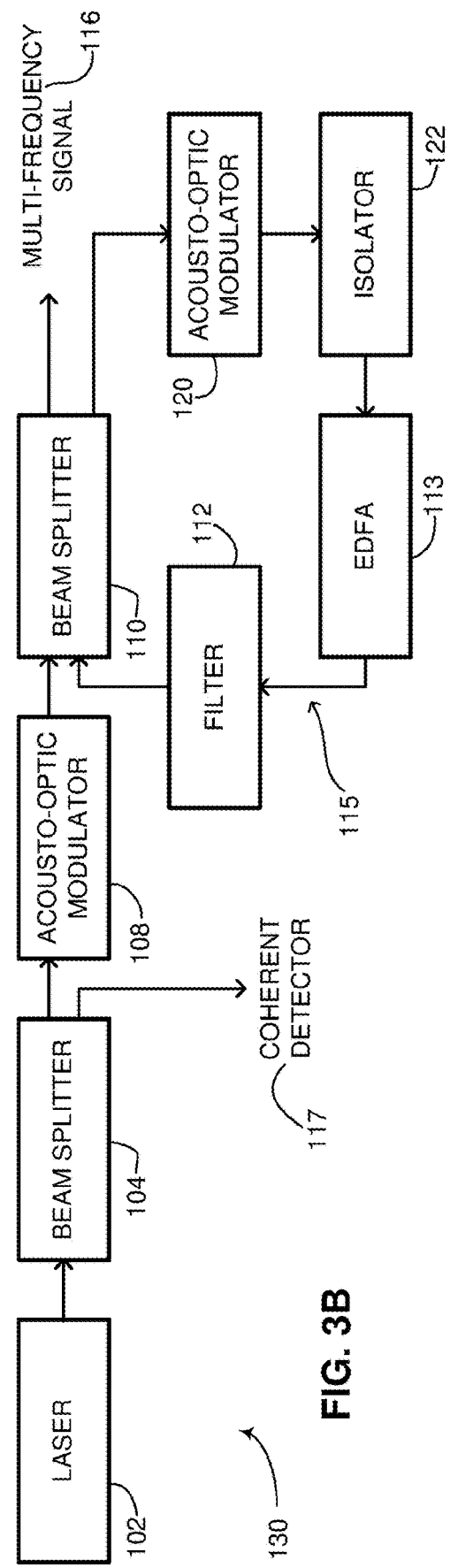

As mentioned above, the disclosed technique makes use of a multi-frequency signal for use in a DAS system. Reference is now made to FIGS. 3A and 3B, which are schematic illustrations of different multi-frequency optical pulse generators, generally referenced 100 and 130 respectively, constructed and operative in accordance with another embodiment of the disclosed technique. Equivalent elements between FIGS. 3A and 3B are labeled with identical reference numbers. With reference to FIG. 3A, multi-frequency optical pulse generator 100 includes a laser 102, a first beam splitter 104, a first acousto-optic modulator (herein abbreviated AOM) $106_1$, a second AOM $106_2$, an $N^{th}$ AOM $106_N$, an erbium-doped fiber amplifier (herein abbreviated EDFA) 113, and a filter 112. As shown, EDFA 113 and filter 112 are optional elements, being surrounded by a dashed box 114 and the number of AOMs is shown as going up to N via the use of ellipses 107. Beam splitter 104 is coupled with laser 102 and with first AOM $106_1$. First AOM $106_1$ is coupled with second AOM $106_2$, second AOM $106_2$ is coupled with the next AOM (not shown) and so forth until $N^{th}$ AOM $106_N$. $N^{th}$ AOM 106N is coupled with EDFA 113 and EDFA 113 is coupled with filter 112. When used, filter 112 outputs a multi-frequency signal 116. When not used, multi-frequency signal 116 is outputted directly by $N^{th}$ AOM $106_N$. As shown, beam splitter 104 is a 1×2 splitter, having one input and two outputs. One output of beam splitter 104 is sent to first AOM $106_1$ while the other output of beam splitter 104 is sent to a coherent detector 117 which forms part of a DAS system (not shown) according to the disclosed technique. As shown, and described in further detail below, $N^{th}$ AOM $106_N$ outputs multi-frequency signal 116 which is then fed into an optical fiber for the purposes of distributed acoustic sensing. It is noted that beam splitter can be a polarization maintaining beam splitter.

Laser 102 can be embodied as an ultranarrow linewidth (herein abbreviated UNLW) laser. Laser 102 can also be embodied as a distributed-feedback fiber laser, an external cavity semiconductor laser or any other single longitudinal mode narrow linewidth laser. As shown beam splitter 104 splits off some of the light generated by laser 102 to be sent to coherent detector 117 (which is part of a DAS system) which may beat and interfere the light with backscattered light received from the DAS system. Beam splitter 104 can have a split ratio of, for example, 50:50, where 50% of the input is transferred to first AOM $106_1$ and 50% of the input is transferred to coherent detector 117. Other ratio splits however are also possible. As shown, the light passed from beam splitter 104 to first AOM $106_1$ is then passed through a series of N AOMs. In this embodiment, the light is passed through at least two AOMs, however as shown, up to N AOMs can be used. Filter 112 can be embodied as a Fabry-Pérot filter, which may have a free spectral range aligned to the frequency shifts of the AOMs or a dense wavelength division multiplexing (herein abbreviated DWDM) filter. Part or all of the AOMs in FIG. 3A may be replaced by at least one electro-optical modulator (herein abbreviated EOM). While an EOM has a broader bandwidth, and therefore may seem more suitable for the architecture of the pulse generator of FIG. 3A, it typically has a smaller extinction ratio and requires more complex electronics.

The plurality of AOMs in this embodiment serves a double purpose. First, they carve out pulses from continuous laser light generated by laser 102 and second they shift the frequency of the light by a predetermined frequency shift, thus generating a multi-frequency pulse. Typical frequency shifts are on the order of 50-500 megahertz (herein abbreviated MHz). Each AOM has a given bandwidth of 10-100 MHZ, thus the frequency of the pulses exiting $N^{th}$ AOM $106_N$ has a frequency shift of the sum of frequency shifts of the entire chain of AOMs. Thus, the more AOMs in the AOM chain the greater the transmission bandwidth. The AOMs can also be of opposite frequency shifts. For example, suppose there are four AOMs in the embodiment of FIG. 3A (thus N=4). Each AOM may have a center frequency of 150 MHz and a bandwidth of 25 MHz each. The first AOM thus can generate pulses with relative frequencies of 100-150 MHz relative to laser 102. The second AOM may shift these pulses to the range 200-300 MHz, and so on. If four AOMs are used then after the fourth AOM, the pulses will have a bandwidth of 400-600 MHz. In order to minimize the required detector bandwidth, half of the AOMs can be aligned to a negative frequency shift, thus generating pulses with relative frequencies in the range of −100 to 100 MHz.

As shown, the resulting multi-frequency pulses exiting $N^{th}$ AOM $106_N$ are optionally amplified using EDFA 113. EDFA 113 can be embodied as any amplifier. Filter 112 is used to reduce any amplified spontaneous emission (herein abbreviated ASE) noise generated by EDFA 113. The optional use of EDFA 113 depends on the initial power of laser 102, the number of AOMs used in this embodiment, the amount of loss generated by the AOMs as well as the allowed peak power of the generated multi-frequency signal for a given DAS system and fiber optic (not shown). If the initial power of laser 102 is high and there is very little loss generated by the AOMs then EDFA 113 and filter 112 may not be used.

With reference to FIG. 3B, multi-frequency pulse generator 130 is shown, which includes some similar components to the multi-frequency pulse generator of FIG. 3A. As opposed to FIG. 3A, multi-frequency pulse generator 130 includes a loop structure, as described below. Identical elements between FIGS. 3A and 3B are labeled using identical reference numbers. Multi-frequency pulse generator 130 includes a laser 102, a first beam splitter 104, a first AOM 108, a second beam splitter 110, a second AOM 120, an isolator 122, an EDFA 113 and a filter 112. First beam splitter 104 may be a 1×2 beam splitter whereas second beam splitter 110 is a 2×2 beam splitter. First beam splitter 104 is coupled with laser 102 and first AOM 108. First beam splitter 104 receives a laser signal from laser 102 and outputs it to first AOM 108 and a coherent detector 117 which forms part of a DAS system (not shown). Second beam splitter 110 is coupled with both first AOM 108 and second AOM 120 as well as with filter 112. Second AOM 120 is coupled with isolator 122 and EDFA 113 is coupled with filter 112 and isolator 122. As shown, second beam splitter 110, second AOM 120, isolator 122, EDFA 113 and filter 112 form a loop 115. First AOM 108 and filter 112 are coupled with the inputs of second beam splitter 110. One output of beam splitter 110 goes to second AOM 120 whereas another output of beam splitter 110 outputs a multi-frequency signal 116 which can be fed into a DAS system coupled with a fiber optic. As mentioned above, multi-frequency signal 116 includes a multi-frequency pulse train wherein each pulse in the pulse train has a different frequency. It is noted that the order and position of second AOM 120, isolator 122, EDFA 113 and filter 112 as shown in FIG. 3B may be altered.

The multi-frequency pulse generator of the disclosed technique is based on the use of multiple AOMs wherein a single AOM creates a series of multi-frequency pulses. This series is then duplicated and shifted in frequency a plurality of times in the loop, thereby generating a multi-frequency signal. According to the disclosed technique, the multi-frequency pulse generator generates a multi-frequency signal having at least two different frequencies. First AOM 108 substantially has two purposes: 1) carving pulses and 2) shifting their frequency. As described in further detail below, second AOM 120 substantially acts as a frequency shifter, for generating a plurality of duplicates of the output of first AOM 108, each duplicate being respectively time separated and frequency shifted. Each pass of the output of first AOM 108 in loop 115 will then result in an additional series of carriers shifted in time by propagation time T of loop 115, and shifted in frequency by the frequency of second AOM 120. The cycling is stopped by stopping the voltage supply of second AOM 120 for a time longer than T. The result is thus multi-frequency signal 116, as shown in FIG. 3B. Multi-frequency pulse generator 130 represents an embodiment of a loop-based multi-frequency generator capable of producing modulated multi-frequency signals having a tunable bandwidth, according to the disclosed technique.

Laser 102 generates light at a certain wavelength for Example 1550 nanometers (herein abbreviated nm). First AOM 108 opens for a series of time durations of t, where t can be for example 100 nanoseconds. Each opening is with a different carrier frequencies $\omega_1 \ldots \omega_z$ for example spaced apart by 10 MHz. As an example, z may be 5. First AOM 108 modulates and shapes each of the z pulses. The pulse shaped by first AOM 108 may be rectangular shaped, or tailored to create a Gaussian pulse, a super-Gaussian shaped pulse or other shaped pulses, for example. Second beam splitter 110 is a 2×2 splitter, having a split ratio of 30:70, where 30% of the power of pulses 1 through z is outputted as multi-frequency signal 116 and 70% of the power is sent to second AOM 120. Second AOM 120 generates a plurality of duplicates of pulses 1 through z, wherein each duplicate is respectively time separated by loop propagation time T, and frequency shifted by second AOM 120 driving a frequency, for example 50 MHZ, thus resulting in j duplicates of pulses 1 through z, each of which will have an additional 50 MHz shift with regards to laser 102. The time separation is such that each one of the resulting pulses do not overlap in time and once all the duplicates are generated, the gate of second AOM 120 is closed to prevent further duplication of the pulses. After receiving the backscattering signal from the end of the optical fiber, which may be for example 100 km in length, the process is repeated, thus forming a pulse-repetition rate (herein abbreviated PRR) of 1 KHz. In general, the AOMs of FIG. 3B function like switches by either sending a signal further on with a shifted frequency, or not shifting it, and resulting in the blocking of the signal. The response depends on the frequency and the amplitude of the voltage received by the AOM. AOMs thus can be gated, wherein the gating period is determined by the amount of time sufficient voltage is provided to the AOM to send a signal further on. Thus as described above, once each of the duplicates is generated, second AOM 120 is turned off, meaning it is gated closed, to prevent further duplicates of pulses 1 through z from being generated until the next PRR cycle. As mentioned above, the AOMs in FIG. 3B can also be replaced by EOMs (with appropriate electronics).

Second AOM 120 sends each of the duplicate pulses through isolator 122 which prevents any backscatter from returning to second AOM 120 and maintains unidirectional movement of the duplicate pulses in loop 115. Isolator 122 passes each of the duplicate pulses through EDFA 113, which amplifies the pulses, ideally with exactly enough amplification to compensate for AOM losses, filter losses and any losses due to second beam splitter 110. EDFA 113 then pass the pulses through filter 112 which is used to reduce any noise in the duplicate pulses resulting from amplification noise (such as ASE), which is caused by the EDFA 113.

According to the disclosed technique, second beam splitter 110 thus outputs the plurality of envelope signals wherein each signal has the same power at it enters the optical fiber for distributed acoustic sensing. In general, according to the disclosed technique, having envelope signals with substantially the same power enables the pulse energy of laser 102 to be used according to the highest possible peak power before the occurrence of non-linear effects. This is achieved by setting the peak power of laser 102 to be the maximum energy for which all the carrier signals have substantially the same height. As described below in FIG. 5, one of the methods for aggregating the phase changes across the different backscattered carrier signals (i.e., frequencies) includes a weighted summation according to the amplitude of the backscattered carrier signals. If all the different carrier signals are transmitted at the same power, any changes in height (i.e., amplitude) in the backscattered carrier signals as received by a detector (not shown) will be a result of changes that occurred to the transmitted carrier signals over the optical fiber, such as due to Rayleigh fading and the presence of events over the fiber. In multi-frequency pulse generator 130, first AOM 108 can be embodied as a single frequency AOM or can be embodied as a chain of AOMs (i.e., at least two AOMs positioned in series) as shown above in FIG. 3A.

As second AOM 120 is embodied as a single frequency AOM, each envelope signal has a number of parameters which can be tweaked and adjusted, thereby enabling a degree of flexibility in multi-frequency pulse generator 130. The main parameters affecting the envelope signals are the length of loop 115 as well as the tunable bandwidth of second AOM 120. Usually the length of loop 115 is set and fixed once multi-frequency pulse generator 130 is constructed, thus making this parameter substantially factory set. The frequency shift however of each envelope signal is a flexible parameter, as second AOM 120 has a tenability of approximately ±25 MHz around a selected frequency shift between consecutive loop passages. As first AOM 108 may be embodied as a chain of AOMs, each carrier signal may have an increased number of parameters which can be tweaked and adjusted, thereby enabling a further degree of flexibility in multi-frequency pulse generator 130. These parameters include the time duration (i.e., pulse width) of each carrier signal, which may be tunable, as well as the frequency shift, which is also tunable and over a larger bandwidth. The lasers and AOMs in both multi-frequency pulse generator 100 (FIG. 3A) and multi-frequency pulse generator 130 (FIG. 3B) are elements which are easily controllable, having parameters that can be altered. It is noted that the laser architecture shown in FIGS. 3A and 3B (as described below) are merely brought as examples of the disclosed technique and that other laser architectures are possible for generating a multi-frequency signal from a single laser source, as per and for use with the disclosed technique.

Reference is now made to FIG. 4, which is a schematic illustration of a multi-frequency DAS system using quasi-coherent detection, generally referenced 150, constructed and operative in accordance with a further embodiment of the disclosed technique. Multi-frequency DAS system 150 includes a multi-frequency pulse generator 152, a circulator 154, an optical fiber 156, a balanced coherent detector 158 and a processor 160. Multi-frequency DAS system 150 can optionally also include an erbium-doped fiber amplifier (herein abbreviated EDFA) (not shown), coupled between circulator 154 and balanced coherent detector 158. As shown, processor 160 can also include a classifier 162. Multi-frequency pulse generator 152 is coupled with circulator 154 and with balanced coherent detector 158. As described above in FIGS. 3A and 3B, multi-frequency pulse generator 152 includes a beam splitter (not shown) for providing the laser signal generated by the laser source (not shown) directly to a coherent detector which forms parts of a DAS system. Circulator 154 is also coupled with optical fiber 156 and balanced coherent detector 158. The direction of travel of signals in circulator 154 is shown by an arrow in circulator 154. Balanced coherent detector 158 is coupled with processor 160. Optical fiber 156 represents an optical fiber under test and can be, for example, as long as 100 km in length. As described in detail below, processor 160 is a processor for quasi-coherent detection in accordance with the disclosed technique. Balanced coherent detector 158 can be any detector capable of yielding the relative phase of the signal to laser 102 (FIGS. 3A and 3B). This includes a balanced coherent detector (as shown in FIG. 4), a polarization dependent balanced coherent detector, a balanced avalanche photodiode, an integrated coherent receiver, as well as also a single photodetector with a low pass filter.

FIG. 4 presents a unique architecture for the aggregation and processing of backscattered signals from a plurality of transmitted signals (i.e., a multi-frequency signal) in real-time while mitigating issues of Rayleigh fading and non-linearities in the phase of the backscattered signals. Multi-frequency pulse generator 152 may be embodied by any one of multi-frequency pulse generators 100 (FIG. 3A) or 130 (FIG. 3B), described above. Multi-frequency pulse generator 152 can also be embodied by a laser source coupled with at least two modulators (either an AOM and/or an electro-optic modulator) which are coupled in series and/or in parallel. Multi-frequency pulse generator 152 can also be embodied as a loop structure including a laser, a first modulator, a splitter and a loop, wherein a portion of the splitter transmits the multi-frequency signal. The loop may include a second modulator, and a third modulator may be placed at the output of the splitters which transmits the multi-frequency signal. In this embodiment, an amplifier and/or a filter can be added to the loop. Multi-frequency pulse generator 152 can further be embodied by any multi-frequency pulse generator known in the art and is not limited to the multi-frequency pulse generators shown above in FIGS. 3A and 3B. As mentioned above, the beam splitter in the multi-frequency pulse generator can be polarization maintaining and thus sends a portion of the multi-frequency pulse generated by multi-frequency pulse generator 152 directly to balanced coherent detector 158 such that it can be beated with backscattered signals provided to balanced coherent detector 158 from circulator 154. All elements in multi-frequency pulse generator 152 may further be polarization maintaining, enabling thus balanced coherent detector 158 to separately detect and measure the different polarization components of the backscattered signals. Balanced coherent detector 158 may be embodied as any optical receiver capable of performing balanced coherent detection. Balanced coherent detector 158 can also be embodied as any known integrated coherent receiver. For example, balanced coherent detector 158 can be replaced by an integrated coherent receiver, thus producing both I and Q fields for each of the polarizations X and Y. According to one embodiment of the disclosed technique, the bandwidth (BW) of balanced coherent detector 158 is defined by the following relationship:

$$BW = K \cdot (BW_k + d) \tag{2}$$

where K is the number of carriers generated by multi-frequency pulse generator 152, $BW_k$ is the bandwidth of a single carrier and d (which is an optional parameter) is the guard bandwidth, which is an extra bandwidth positioned between carriers to avoid any crosstalk effects. As an example, K may be 100, $BW_k$ may be 15 MHz and d may be 5 MHz, thus giving a total BW of 2 GHz. Optionally, as mentioned above, an EDFA may be positioned before balanced coherent detector 158. The EDFA may improve the SNR of the received backscattered signals by amplifying the received backscattered signals prior to detection by balanced coherent detector 158.

Processor 160 may be embodied as a CPU (central processing unit), a GPU (graphics processing unit), an FPGA (field-programmable gate array) or an ASIC (application-specific integrated circuit). In one embodiment of processor 160, each of the CPU, GPU, FPGA and/or ASIC should be capable of real-time processing. As described in detail below, processor 160 performs the following determinations: 1) quasi-coherent aggregation of all the different carrier signals in a backscattered multi-frequency signal and 2) detection of events, classification of events and alerting (if necessary) based on the quasi-coherent detection. The processing can be done using a single strong processor or a combination of two or more processors working in parallel, in series, in a pipeline and the like. As shown, processor 160 can include classifier 162 for the classification of events based on the processing of the backscattered signals in real-time, including the issuance of an alarm based on the classification of the events.

As shown, multi-frequency pulse generator 152 generates a multi-frequency signal which is sent to both circulator 154 and balanced coherent detector 158. The multi-frequency signal sent to circulator 154 is then transmitted as a multi-frequency signal over optical fiber 156. Backscattered signals from the multi-frequency signal in optical fiber 156 are scattered back to circulator 154 which then transmits those backscattered signals to balanced coherent detector 158. Balanced coherent detector 158 beats the backscattered signals with signals generated by multi-frequency pulse generator 152. In the embodiments in which multi-frequency pulse generator 152 is polarization maintaining, and balanced coherent detector 158 measures both polarizations, information from the difference between both polarizations can be used to characterize changes in the fiber environment up to the backscattering cell. The detected signals are then sent to processor 160 for quasi-coherent detection, according to the disclosed technique (and described in greater detail below), wherein phase and/or amplitude information of each of the different frequency signals is determined. The phase and/or amplitude information is then aggregated by processor 160 which then determines if an event occurred over optical fiber 156. If processor 160 determines that an event occurred over optical fiber 156, then classifier 162 can be used to classify the detected event.

Balanced coherent detector 158 captures both the amplitude and phase of the backscattered signals, and in some embodiments also the polarization thereof. Using this information, processor 160 can then execute an aggregation of the determined phase changes, which can be executed in real-time, as described below, thereby overcoming inherent, wavelength-dependent phase noise, overcoming Rayleigh fading and also significantly increasing the SNR of multi-frequency DAS system 150. Phase extraction of the backscattered signals can then be executed and can be classified by classifier 162, thereby enabling a classification of events occurring along optical fiber 156.

Changes in the parameters of multi-frequency pulse generator 152 such as pulse width, pulse duration as well as the number of carrier signals generated in the transmitted multi-frequency signal, according to the disclosed technique, can change the spatial resolution of multi-frequency DAS system 150. According to the disclosed technique, the spatial resolution is related to the pulse width, thus as the pulse width increases, the spatial resolution decreases (meaning an increase in the distance over a fiber optic wherein consecutive events can be detected as separate events). As an example, a pulse width of approximately 10 ns gives a spatial resolution of approximately 1 meter. Thus a pulse width of 50 ns will give a spatial resolution of 5 meters and a pulse width of 100 ns will give a spatial resolution of 10 meters. Thus the larger the pulse width the lower the achievable spatial resolution. However, also according to the disclosed technique, as the pulse length increases, the SNR of the backscattered signals increases, thus lower spatial resolution is accompanied by better SNR of the detected backscattered signals. In addition, there is an inverse ratio between the pulse width and its bandwidth, where the ratio can be expressed as $$BW \sim \frac{1000}{PW} \quad (3)$$

where BW is the bandwidth in MHz and PW is the pulse width in nanoseconds. Thus if high spatial resolution is desired, a shorter pulse width must be used. This however will also limit the bandwidth and thus the number of different wavelengths that can be used within the multi-frequency signal. In general, the number of carriers selected for the multi-frequency signal of the disclosed technique will not affect the spatial resolution but will influence the SNR of backscattered signals. As known in the prior art, using up to 4-6 different frequencies in a multi-frequency signal can dramatically improve the SNR of the backscattered signals since such a setup overcomes Rayleigh fading. According to the disclosed technique, by using more than just 4-6 different frequencies in a multi-frequency signal, the SNR of the backscattered signals can be improved by a factor of $\sqrt{K}$ where K is the number of different frequencies generated in the multi-frequency signal. This is a result of Equation (9) below, where the aggregation of component (a) adds coherently, while component (b) adds a random phase value. Given the different parameters of multi-frequency pulse generator 152 which can be altered and their relationship to the spatial resolution as well as the SNR, it is clear that according to the disclosed technique, there is a tradeoff between spatial resolution and SNR. Thus for example, if 100 carriers are used having a pulse width of 50 ns (thus achieving a bandwidth of 2 GHz), a high spatial resolution of 5 meters will be achieved with good SNR. However if 1000 carriers are used having a pulse width of 500 ns (thus also achieving a bandwidth of 2 GHZ), a low spatial resolution of 50 meters will be achieved however with extremely high SNR. The different parameters of multi-frequency pulse generator 152 can thus be tweaked and altered depending on the desired spatial resolution and SNR required in a given embodiment and setup of multi-frequency DAS system 150. It is noted as well that according to the disclosed technique, a multi-frequency signal can be generated wherein a first portion of the generated carriers have a very short pulse width (for example, equal to or less than 50 ns) and a second portion of the generated carriers have a very long pulse width (for example, greater than 100 ns). The very short pulse width carriers will provide high resolution for a first portion of the backscattered signals whereas the very long pulse width carriers will provide high SNR for a second portion of the backscattered signals, thereby combining the advantages of high spatial resolution and high SNR and addressing the third challenge presented in the background section above. Thus, according to the disclosed technique, parameters such as the spatial resolution of multi-frequency DAS system 150 can be easily tweaked and adjusted to accommodate various environments and setups wherein DAS systems are used.

Reference is now made to FIG. 5, which is a schematic illustration of a quasi-coherent detection method of a multi-frequency backscattered signal, generally referenced 180, constructed and operative in accordance with another embodiment of the disclosed technique. The method of FIG. 5 shows the differences of the quasi-coherent detection method of the disclosed technique as opposed to the techniques of incoherent integration (detection) and coherent integration (detection) described above in FIGS. 2A and 2B. Before transmission, a multi-frequency signal is generated (not shown), for example using a multi-frequency pulse generator such as multi-frequency pulse generator 152 (FIG. 4). The multi-frequency signal is then transmitted over a fiber optic (not shown) and backscattered signals begin to reflect back along the fiber optic and are received by a receiver such as balanced coherent detector 158 (FIG. 4). At a given point in time, backscattered signals from different backscattering cells are received, each with a different frequency. Thus, the different frequency carriers must be separated upon being received. The backscattered signals are received optically by a balanced coherent receiver (not shown), and are converted into digital signals, shown as a process 182 in FIG. 5. The received backscattered signals are then digitally separated by frequency (i.e., into separate channels) based on the different frequencies in the transmitted multi-frequency signal through a process of channelization 184, similar to incoherent integration as described above. Once the received multi-frequency backscattered signal has been channelized into K channels, each channel can then be processed separately as a first processed channel 186$_1$, a second processed channel 186$_2$, a third processed channel 186$_3$ and the like until a $K^{th}$ processed channel 186$_K$. According to the disclosed technique, the benefits of optically receiving the backscattered signals as coherent signals and then processing each channel of the backscattered signals separately include:

1) a larger dynamic range for received backscattered signals, as received backscattered signals are proportional to the electro-optical field but not to the intensity of the electro-optical field; and
2) enables the option of measuring any polarization effects in the received backscattered signals.

The processing per channel can involve determining the phase change and/or amplitude change at each frequency of the multi-frequency signal which was initially transmitted into the fiber optic. According to the disclosed technique, coherent detection can be used to detect a phasor for each frequency and in some embodiments for each polarization component, thereby enabling both the amplitude change and phase change of each channel to be extracted. A novel procedure of channel aggregation 188, as explained below, is then executed, wherein amplitude and/or phase change information from all the channels is selectively aggregated. The aggregation of the information from all the channels then enables a decision to be made if an event has indeed been detected based on the information received over each of the channels in the backscattered signals. This is shown as a procedure of channel detection and event decision 190 of the backscattered signals which can be executed in real-time. The channel aggregation of the disclosed technique can involve novel aggregation of the extracted phase changes to create a single phase change map based on all the different frequencies of the multi-frequency signal. Thus the result of the phase extraction is a single phase change map of events along the fiber optic with a significant reduction of the phase noise.

The method of FIG. 5 shows that the quasi-coherent detection of the disclosed technique shares certain procedures in common with both incoherent detection as well as coherent detection. For example, similar to incoherent detection, the quasi-coherent detection of the disclosed technique includes a procedure of digitally separating the backscattered signal according to the different frequencies in the transmitted multi-frequency signal, thus enabling separate processing of K different channels by frequency. Similar to incoherent detection, there is no requirement for the scattering coefficients of the different carriers to be identical at any backscattering cell along the optical fiber. However unlike incoherent detection, in which a separate detection per channel is executed, thereby leading to low SNR, in quasi-coherent detection a novel aggregation is executed over all channels thus leading to higher SNR. In general, as per the disclosed technique, an aggregation of a plurality of frequencies of a backscattered signal may result in an improvement in the SNR as compared to the case of a single frequency of a backscattered signal. Similar to coherent detection, the quasi-coherent detection of the disclosed technique includes a procedure of channel aggregation, thus leading to a procedure of channel detection and event decision over a single channel, thus resulting in a high SNR. Even though in theory, full coherent detection may lead to even higher SNR than the quasi-coherent detection method of the disclosed technique, full coherent detection relies on the constructive interference between signals from different carriers, and therefore fails under real-life circumstances as mentioned above. Thus unlike coherent detection, where a dependence of the different phase changes per frequency is introduced by using a single coherent matched filter, in quasi-coherent detection separate processing can be executed for each channel. Quasi-coherent detection thereby does not require the same scattering coefficient for all channels, and does not fail as coherent detection does.

Regarding the processing of the backscattered signals according to the disclosed technique, the following mathematical treatment is presented to better explain the disclosed technique. As mentioned above, in DAS systems, backscattered signals over a fiber optic have to contend with two different sources of noise, the first being Rayleigh fading and the second being the non-linear response of the phase changes in backscattered signals. The treatment below expresses these sources of noise mathematically. Assuming a pulse with duration t along an optical fiber, dispersion may be disregarded (which is small in the case of pulses longer than 1 ns and propagating for a distance of 100 km). The effective index of refraction in the fiber at any given point can be defined as $n=n_g$, with the velocity of light through a particular medium being defined as $$v = \frac{c}{n},$$

where c is ine speed of night through vacuum. The amplitude of a pulse at time t having a carrier frequency of $\omega_k/2\pi$ and entering an optical fiber with boundary conditions $A_0(\omega_k; t)$ can be defined as follows:

$$A(\omega_k; Z, t_1) = e^{i(\beta z - \omega_k t_1)} A_0(\omega_k; t_1 - z/v) \quad (4)$$

where z is a point along the optical fiber and $A(\omega_k; z, t_1)$ thus represents the amplitude of a pulse at point z (i.e., a distance z from the start of the fiber optic up until point z) down the fiber after a time $t_1$ having a carrier frequency of $\omega_k$ amongst K carriers. The parameter $e^{i(\beta z - \omega_k t_1)}$ represents the change in the phase of the pulse as the pulse propagates along the fiber optic up to a distance z. Part of the transmitted pulse is backscattered by a scatterer m at a location $z_m$ along the fiber optic, where the scatterer is substantially a microscopic inconsistency in the index of refraction of the fiber optic at location $z_m$. The backscattered signal originating from point $z_m$ along the fiber at a time $t_1$ can be thought of as a multiplication by an arbitrary complex backscattering coefficient $r_m$ located at location $z_m$, and can be expressed as follows:

$$B_m(\omega_k; z_m, t=t_1+t_2) = r_m e^{i(\beta z_m - \omega_k t_2)} A(\omega_k; z, t_1) \quad (5)$$

which can be rewritten as $$B_m(\omega_k; z_m, t = t_1 + t_2) = r_m e^{i(2\beta z_m - \omega_k t)} A_0\left(\omega_k; t - 2\frac{z_m}{v}\right) \quad (6)$$

In general, this scattering is what we refer to as Rayleigh backscattering, and what is used in DAS. The actual amplitude of a backscattered signal is arbitrary and random and cannot be predicted mathematically because impurities and imperfections in the fiber cannot be predicted. Thus $B_m(\omega_k; z_m, t)$ represents the backscattered signal at point $z_m$ which is backscattered due to scatterer m having a carrier frequency of $\omega_k$ amongst K carriers. The total amplitude of the backscattered signal reaching a detector at the start of the fiber optic at time t is the interference of backscattered amplitudes from a range of locations along the length of the fiber optic equal to $v\tau/2$, where $\tau$ is the pulse duration, as mentioned above, and has been termed a backscattering cell. For multiple carriers (i.e., K carriers) with different frequencies, represented as $\omega_k/2\pi$, the total amplitude of the backscattered signals is a sum of the scatterings from different backscattering cells, with different frequencies. The total field of the backscattered signal can thus be represented mathematically as $$B(t) = \Sigma_k \Sigma_m r_m e^{i(2\beta(\omega_k) z_m - \omega_k t)} A_0(\omega_k; t - 2z_m/v) \quad (7)$$

which includes a first sum $\Sigma_k$ over K carriers and a second sum $\Sigma_m$ over all scatterers m in the backscattering cell extending in the range $z_1 \ldots z_2$, where $$z_1 = \frac{v}{2}(t - \tau - t_{d(k)})$$

and $$z_2 = \frac{v}{2}(t - t_{d(k)}).$$

Here $t_{d(k)}$ is the delay of the transmitted pulse corresponding to carrier k and $\tau$ is the pulse duration. As written, the summations are over all carriers and all scatterers for each backscattering coefficient $r_m$. The phase term in (8) consists of a temporal phase $\omega_k t$ that is used for digitally channelizing the K different carriers, and a spatial phase $\beta(\omega_k) z_m$ that is influenced by the strain and temperature changes along the fiber.

The location $z_m$ representing a scatterer m at a distance z along the fiber optic can be separated into a macroscopic distance z which is common to all scatterers which participate in the backscattered signal up to point z, as well as a scattering component $z_m'$ which is different for each scatterer. Thus location $z_m$ can be represented as follows:

$$z_m = z + z_m' \quad (8)$$

Based on the above separation, the spatial phase term in Equation (7) can be expanded as:

$$2\beta z_m = \underbrace{\frac{4\pi}{\lambda} \int_0^z n(z') dz'}_{a} + \underbrace{\frac{4\pi n(z)}{\lambda} z_m'}_{b} \quad (9)$$

which shows that the spatial phase of the backscattered field has two separate dependency components (a and b) on the local index of refraction along the optical fiber. In equation (9) we express the dependence of $\beta$ on the local index of refraction explicitly. The dependence of component (a) expresses the dependency of the phase of the backscattered signal on the integral of the local index of refraction along the path of pulse propagation up to location z. This component of the spatial phase is thus common to all the scatterers m contributing to Equation (9). Component (b) expresses the notion that each scatterer m has a different phase depending on its microscopic location. A macroscopic scattering coefficient from location z . . . (z+dz) can then be written as:

$$r_\omega(z) dz = \sum_{z_m'} r_m e^{\frac{2i\omega n(z)}{c} z_m'} = |r_\omega(z)| e^{i\Phi_\omega(z)} \quad (10)$$

wherein the carrier dependence explicitly shows the dependence of the scattering coefficient on the carrier frequency. Changes in the local index of refraction and strain will change the relative phases between scattered signals from different scatterers and therefore both the overall phase and the amplitude of the backscattered signal will change as well. However, the change itself will depend on the microscopic unknown quantities $z_m'$.

The dependence of component (a) enables a measure of the change in strain in a linear manner. In order to obtain the local strain, rather than integrating the component quantity in Equation (9), the difference in the phases between the scattering from two different backscattering cells, separated by a gauge length $l_g$ can be taken. This difference can be expressed as:

$$\frac{4\pi n(z) l_g}{\lambda} + \Phi_\omega(z_2) - \Phi_\omega(z_1) \quad (11)$$

Changes in this phase can be tracked and measured, yielding a linear measurement of the strain along each gauge length along the optical fiber. Even though the phases of component (a) are themselves different for the different carriers, typically changes in the phases between consecutive pulse trains are kept below $\sim\pi$ to avoid problems in phase unwrapping issues. In such a case, the differences between phase differences of the different carriers are orders of magnitude smaller than the measured phases and can thus be neglected.

The dependence of component (b) depends nonlinearly on both the strain and the frequency of the different carriers. The initial phase depends on the random locations of the scatterers and is different for the different carriers. The resulting interference amplitude thus fluctuates rapidly. The phase fluctuates rapidly around the expectation value of $$\frac{4\pi n \epsilon \langle z_m \rangle}{\lambda},$$

where $\langle z_m \rangle$ is the mean value of $z_m$ in the backscattering cell, causing unpredictable changes in the amplitude as well. For this reason, as described above, the signal in an amplitude-based DAS system is typically not linear to the strain. As in component (a), the phases $\Phi_\omega(z)$ are themselves different for the different carrier frequencies and the fluctuations of the strain are different and yield different changes for the different carriers. An example of this can be seen below in FIG. 10.

According to the disclosed technique, a change in the fiber at a point z will change both the backscattered signal amplitude and phase for the light reaching the detector in a given time period. Both changes are not linear (or even monotonic) in the disturbance or scatterer (such as temperature, pressure, vibrations and the like). And even if the backscattering amplitude would change linearly, the phase dependence on $z_m$ together with the distribution of $z_m$ will ensure the sum will not change monotonically with the disturbance. Thus for the same reason, changes in both the amplitude and phase are wavelength dependent, and for frequency differences larger than $1/\tau$, the backscattering amplitudes are statistically independent. Through the change in index of refraction at a point z due to an event occurring along the optical fiber, the phase of the backscattered signal changes not only in the vicinity of the disturbance but for all points beyond the disturbance. Since for some locations it can occur that the sum over backscattered signals may be small, (thus leading to fading), it is advantageous according to the disclosed technique to use the phase change as described above in Equation (7) as the input for the multi-wavelength DAS system of the disclosed technique.

In order to make the backscattered signal local and to extract the value of the backscattered signal from a specific point along the optical fiber, a differentiation of the phase can be executed. Changes in the optical fiber's environment, such as changes in the temperature, pressure or other variables will affect the index of refraction of the optical fiber. According to the disclosed technique, the quantity which will be affected linearly by a change in the index of refraction of the optical fiber will be the change in the phase of the backscattered signal. Thus the DAS system of the disclosed technique investigates and attempts to resolve where an event happened that changed the index of refraction of the optical fiber via a determination of a phase difference between two different points along the optical fiber.

Changes in the phase happen over time and over distance. Thus to determine a difference in phase, changes in the phase are determined at a distance $z_1$ as compared to a distance $z_2$ separated by a gauge length $l_g$ as expressed above in Equation (11). Over time, the phase difference in the backscattered signals will present as a linear change (that is almost frequency independent) as well as a non-linear term (that is frequency dependent). The linear change is frequency independent as long as dispersion can be neglected. In the case of the disclosed technique, the dependency of the phase difference on the frequency is practically speaking negligible and thus it can be stated that the linear change is almost frequency independent. As mentioned above, frequency diversity (i.e., use of a multi-wavelength signal) has been suggested for overcoming Rayleigh fading in the prior art. However according to the disclosed technique, frequency diversity is used to overcome the non-linear effects of the backscattered signals as presented above in Equations (9) and (11). For this reason, a plurality of independent measurements is required and thus only using coherent detection as described above in FIG. 2B will not suffice. The determined phase change per frequency, as per the disclosed technique, maintains the independence of the changes in index of refraction over the fiber. Since the improvement in SNR according to the disclosed technique goes according to $\sqrt{K}$, a factor of 10 improvement requires a multi-wavelength signal having 100 frequencies.

The novel aggregation of the phase changes for each extracted wavelength in the backscattered signal (i.e., channel aggregation 188) can be executed in a number of different ways according to the disclosed technique and is based on combining an intermediate product with corresponding weights. Channel aggregation 188 is based on the four phase measurements per carrier which come from two backscattered cells, at two consecutive PRR cycles. Thus for each channel, the phase difference can be defined as $$(\Phi_2(t+\Delta t)-\Phi_1(t+\Delta t))-(\Phi_2(t)-\Phi_1(t)) \quad (12)$$

where $\Phi_1$ and $\Phi_2$ represent phase measurements of a backscattered cell. In order to weight the phases according to the corresponding amplitude, phasors $P_i=A_i e^{i\Phi_i}$ can be considered, where $A_i$ is the corresponding amplitude to the phase $\Phi_i$. As shown in Equation (12), the phase measurements of two different backscattered cells are compared, one at time $t+\Delta t$ and another at time t. As there are four phase measurements involved for each channel, the novel aggregation of the disclosed technique can be embodied by different computations and considerations of each of the four phase measurements, as follows:

i. According to a first embodiment of the disclosed technique, the aggregation is executed by only considering carriers which have amplitudes above a predetermined threshold at all four phase measurements.

ii. According to a second embodiment of the disclosed technique, the aggregation is executed by extracting the phase measurement from each phasor for each frequency and then summing the extracted phases.

iii. According to a third embodiment of the disclosed technique, the aggregation is executed by extracting the phase measurement from each phasor for each frequency, and averaging each of the phases in Equation (12) by the corresponding amplitudes of the different carriers.

iv. According to a fourth embodiment of the disclosed technique, the aggregation is executed by extracting the phase measurement from each phasor for each frequency, and averaging each of the phases in Equation (12) by the corresponding amplitudes squared of the different carriers, thus representing the power received at the corresponding carrier frequency.

v. According to a fifth embodiment of the disclosed technique, the aggregation is executed by extracting the phase measurement from each phasor for each frequency, and averaging each of the phases in Equation (12) by a sigmoid function of the amplitudes of the different carriers. The advantage of a sigmoid function is that it gives small weight for backscattering cells with Rayleigh fading and diversity for backscattering cells that have a significant amplitude while disregarding the amplitude itself.

vi. According to a sixth embodiment of the disclosed technique, the aggregation is executed by first calculating Equation (12) for each carrier separately, and then aggregating the result by weighting each component by the corresponding product of the square of the amplitudes at each phase measurement point.

vii. According to a seventh embodiment of the disclosed technique, the aggregation is executed by first calculating Equation (12) for each carrier separately, and then aggregating the result by weighting each component by the corresponding product of the amplitudes at each phase measurement point. The mathematical result of such a summation is that the contribution of each phasor in the final sum will be based on the amount of amplitude of each phasor. Thus a weighted sum of the phasors based on amplitude can be achieved without having to actually extract the phase and the amplitude and only then make a weighted calculation. In this case the weighting of Equation (12) becomes angle [$\Sigma_k A_2(\omega_k, t+\Delta t)A_1^*(\omega_k, t+\Delta t) A_2^*(\omega_k, t)A_1(\omega_k, t)$].

viii. According to an eighth embodiment of the disclosed technique, the aggregation is executed by first calculating Equation (12) for each carrier separately, and then aggregating the result by weighting each component by a sigmoid function of the corresponding product of the amplitudes at each phase measurement point.

ix. According to a ninth embodiment of the disclosed technique, the aggregation is executed by combining the quasi-coherent detection of the disclosed technique with coherent detection, thus further enabling a high SNR to be achieved while also enabling high spatial resolution in distinguishing events on the optical fiber, for example in situations where the signal is weak and non-linearities of component (b) of Equation (9) are small. Once all the backscattered signal data at the detector is received, the backscattered signal data is passed to two different, yet simultaneous, processing paths. One path sums the backscattered signal data using coherent detection (i.e., using a wide filter that receives all wavelengths within the multi-wavelength signal) whereas another path sums the backscattered signal data using quasi-coherent detection, for example as described immediately above in one of embodiments i. to viii. The results of both summations can then be combined using a weighting function, such as by using a Kalman filter. Whereas this ninth embodiment has the disadvantage of requiring more computing power, it presents the advantage of achieving high SNR from the coherent detection yet also achieving high spatial resolution from the quasi-coherent detection.

x. According to a tenth embodiment of the disclosed technique, the two polarizations of each carrier are treated as independent carriers, thus multiplying the number of carriers K.

xi. According to an eleventh embodiment of the disclosed technique, the two polarizations of each carrier are treated together, yielding an additional measure to the phase, which is the polarization change of the backscattered signal at the carrier frequency.

It is also noted that according to the disclosed technique, the aggregation method (as per the embodiments listed above) as well as the parameters of the DAS system as described in FIG. 4 above can be modified and dynamically changed based on the results of the method shown in FIG. 5.

Figure 6:
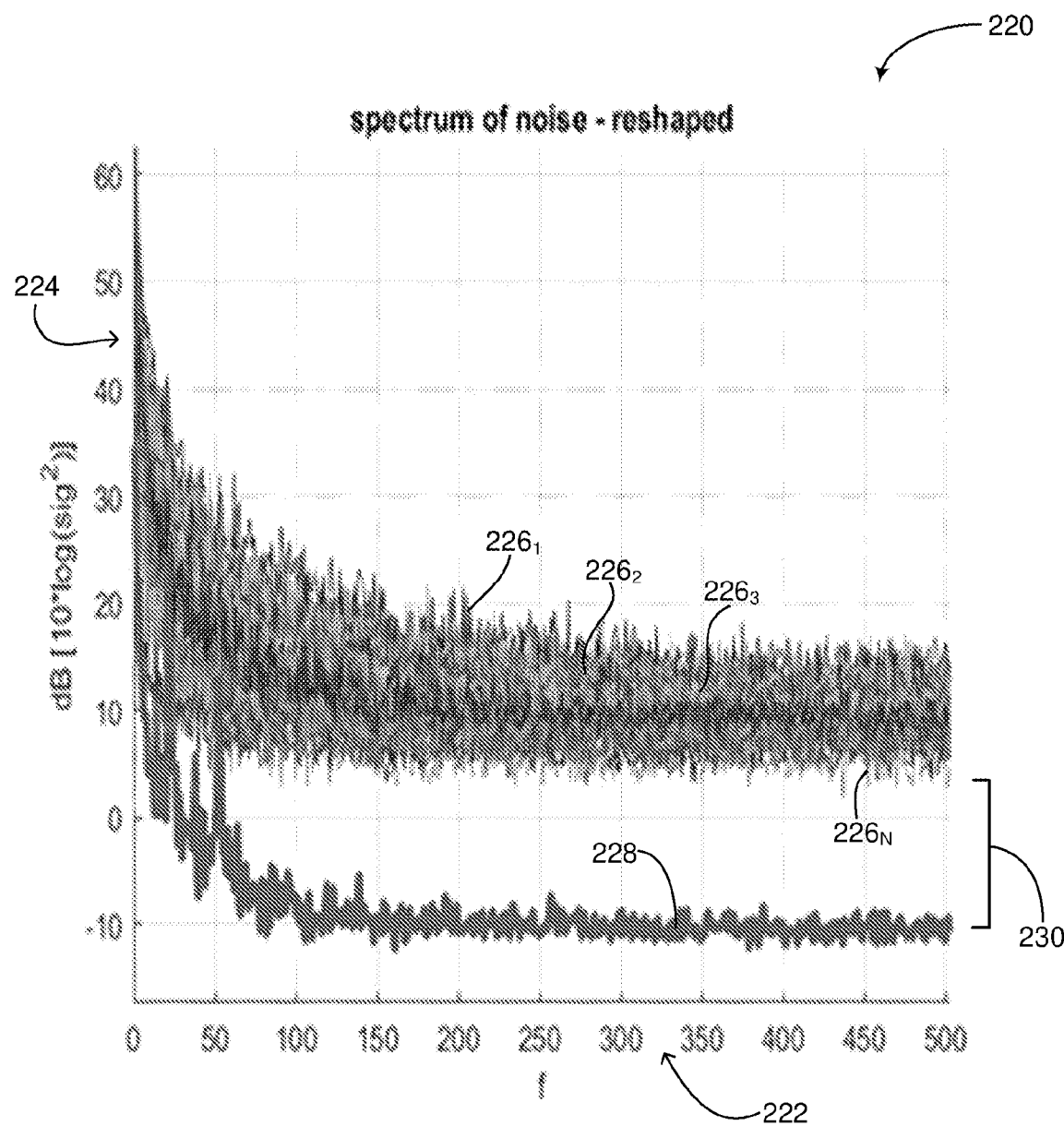
FIG. 6 is a graph comparing the phase noise floor of a plurality of single carriers versus the phase noise floor of a quasi-summed multi-frequency carrier, constructed and operative in accordance with a further embodiment of the disclosed technique.

Reference is now made to FIG. 6, which is a graph comparing the phase noise floor of a plurality of single carriers versus the phase noise floor of a quasi-summed multi-frequency carrier, generally referenced 220, constructed and operative in accordance with a further embodiment of the disclosed technique. Graph 220 includes an X-axis 222, showing carrier frequencies in units of hertz (herein abbreviated Hz) and a Y-axis 224, showing phase noise in units of decibels (herein abbreviated dB). A plurality of lines $226_1$, $226_2$, $226_3$ and $226_N$ shows the phase noise as a function of carrier frequency of a plurality of single carriers (i.e., single frequencies) extracted from a backscattered multi-frequency signal using incoherent detection. Thus each one of lines $226_1$-$226_N$ represents a different amount of phase noise over carrier frequency for each of the extracted phases when incoherent detection is used (as described above in FIG. 2A). A thicker line 228 shows the phase noise as a function of carrier frequency of a plurality of single carriers which were extracted from a backscattered multi-frequency signal and then summed according to the quasi-coherent detection of the disclosed technique. Thus line 228 at the bottom of graph 220 shows the phase noise floor of a quasi-coherent summation of all the frequencies in the backscattered multi-frequency signal as compared to the phase noise floor of single and individual frequencies (lines $226_1$-$226_N$) in the same backscattered multi-frequency signal. A bracket 230 points to the difference in phase noise floor between the single carrier extracted using incoherent detection having the lowest phase noise floor (line $226_N$) and the phase noise floor of the extracted and summed carriers (line 228) using the quasi-coherent detection of the disclosed technique. Since Y-axis 224 is in units of dB, which is a logarithmic scale, each jump of 10 dB represents a difference of an order of magnitude. Thus the phase noise floor of line 228, which levels out at around −10 dB is less noisy than the phase noise floor of line $226_N$ (which is the phase noise floor of the single carrier frequency having the lowest phase noise floor), which levels out (on average of all the individual wavelengths) at around 10 dB. Since the values on Y-axis 224 are not absolute values but rather relative values, the difference in the phase noise floor between lines $226_1$-$226_N$ and line 228 is thus around 20 dB. As can be seen the quasi-coherent detection of the disclosed technique shows an improvement of up to 35 dB throughout graph 220 over the frequencies which are shown. The spread in noise of lines $226_1$-$226_N$ demonstrates the advantages of proper weighting of the different carriers. There is a large variation between the SNR of the different carriers, and according to the disclosed technique correct weighting can yield a large improvement as shown by line 228. Graph 220 thus demonstrates a significant improvement in SNR for the quasi-coherent integration of the disclosed technique over using just incoherent integration. As shown, an aggregation of the extracted phase changes using the disclosed technique significantly reduces the phase noise effect in backscattered signals. It is noted that in the graph of FIG. 6, the values and data shown are for a particular slice of time at a particular point along an optical fiber and that the values and data shown might be different at a different slice of time and at a different point along the optical fiber, also implying the need for a selective aggregation.

Figure 7:
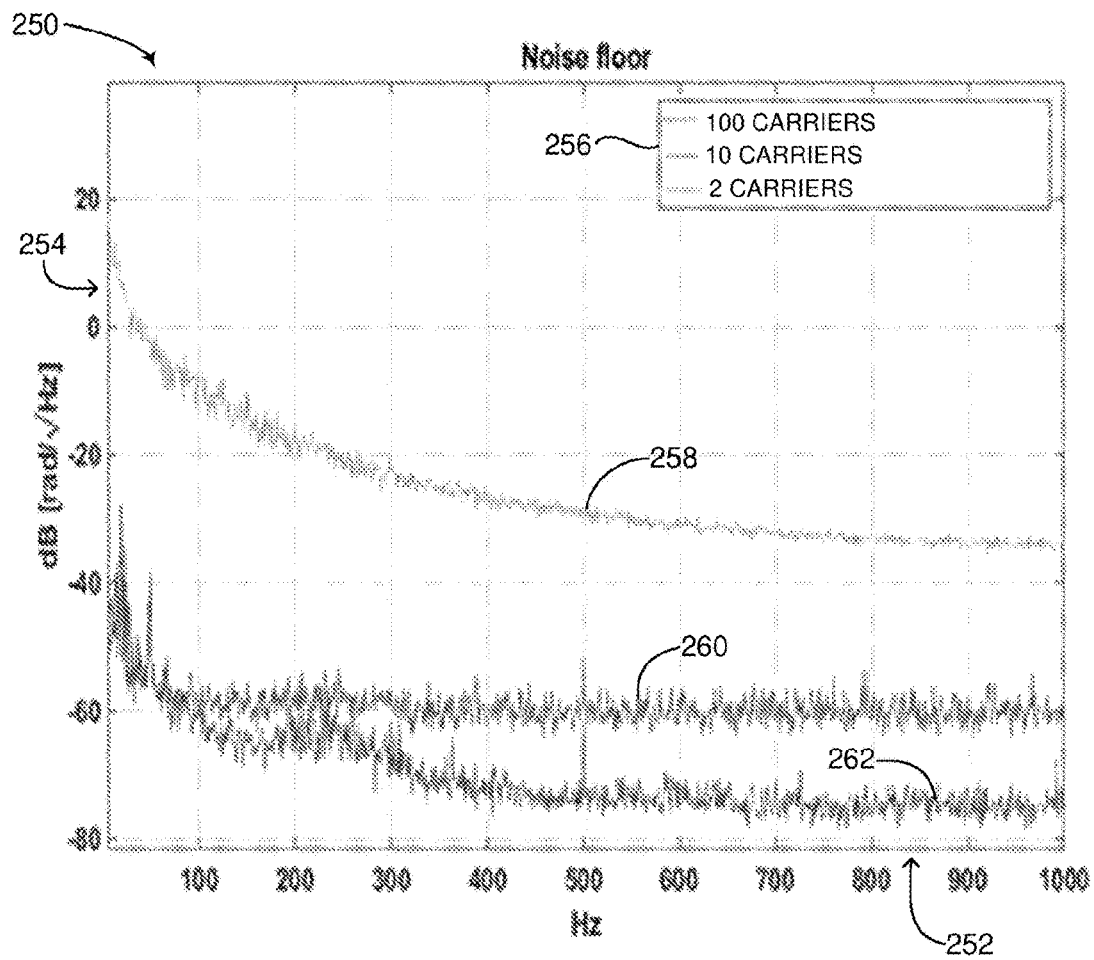
FIG. 7 is a graph showing the difference in phase noise floor as the number of carriers is increased, constructed and operative in accordance with another embodiment of the disclosed technique.

Reference is now made to FIG. 7, which is a graph showing the difference in phase noise floor as the number of carriers is increased, generally referenced 250, constructed and operative in accordance with another embodiment of the disclosed technique. Graph 250 includes an X-axis 252, showing frequency in units of Hz and a Y-axis 254, showing phase noise in units of dB. A legend 256 shows the phase noise floor of backscattered multi-frequency signals from which phase changes are extracted and summed according to the disclosed technique, for three different amounts of carriers in a transmitted multi-frequency signal. A first line 258 shows the phase noise floor as a function of frequency of the quasi-coherent summation of all the frequencies (i.e., carriers) when the transmitted multi-frequency signal includes 2 carriers. A second line 260 shows the phase noise floor as a function of frequency of the quasi-coherent summation of all the frequencies (i.e., carriers) when the transmitted multi-frequency signal includes 10 carriers. A third line 262 shows the phase noise floor as a function of frequency of the quasi-coherent summation of all the frequencies (i.e., carriers) when the transmitted multi-frequency signal includes 100 carriers. As can clearly be seen, an increase in the number of carriers in the multi-frequency signal leads to significant improvements in the SNR of the extracted phase changes of the backscattered signals. The SNR is improved dramatically from 2 carriers to 10 carriers due to the overcoming of Rayleigh fading. As shown, a further increase in the number of carriers shows an improvement on the order of $\sqrt{K}$ (K being the number of carriers). This is due to the decrease of wavelength dependent phase noise in the backscattered multi-frequency signal by using the quasi-coherent detection of the disclosed technique, thus addressing the non-linearity issue of the phase changes it the backscattered multi-frequency signal.

Figure 8:
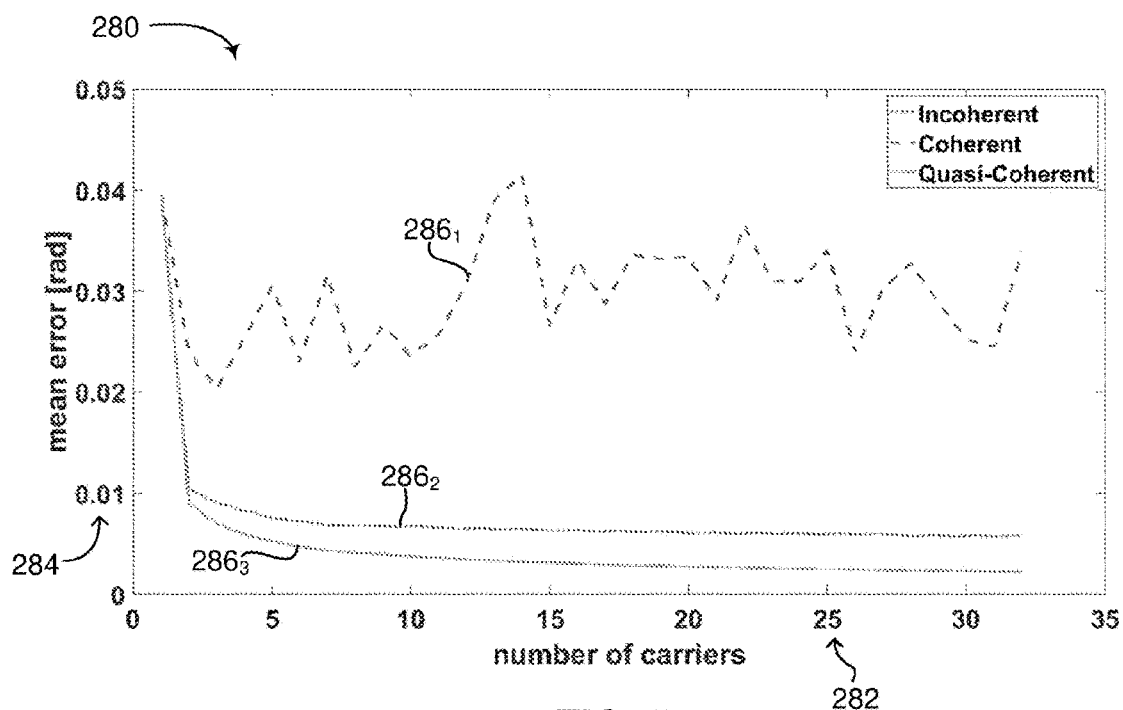
FIG. 8 is a graph showing the difference between the expected phase change and the determined phase change in a backscattered multi-frequency backscattered signal as the number of carriers increases for each of the coherent, incoherent and quasi-coherent integration methods described above, constructed and operative in accordance with a further embodiment of the disclosed technique.

Reference is now made to FIG. 8, which is a graph showing the difference between the expected phase change and the determined phase change in a backscattered multi-frequency backscattered signal as the number of carriers increases for each of the coherent, incoherent and quasi-coherent integration methods described above, generally referenced 280, constructed and operative in accordance with a further embodiment of the disclosed technique. The curves in graph 280 are a result of simulations such as those described above in FIGS. 2D-2G. Graph 280 includes an X-axis 282 which represents the number of carriers in the backscattered signal, while a Y-axis 284 represents the mean error in radians of the phase change of a backscattered signal as compared to the expected change (see FIG. 2C above). A first curve 286$_1$ represents the change in mean error as the number of carriers increases when using coherent integration. A second curve 286$_2$ represents the change in mean error as the number of carriers increases when using incoherent integration. And a third curve 286$_3$ represents the change in mean error as the number of carriers increases when using quasi-coherent integration. As can be seen, as the number of carriers increases, coherent integration only exhibits local improvement in mean error. As described above, this is partially due to the lack of diversity of the different carriers as used in the processing according to coherent integration, and partially due to the loss of constructive interference required for the success of coherent detection. This is because the extent of the simulated signal exceeds the gauge length of 10 meters (chosen for the simulation), causing a substantial non-linear change in the backscattering signal from all backscattering cells in addition to the linear response. Incoherent integration exhibits a marked decrease in mean error as the number of carriers approaches 10 and then a slight decrease in mean error as the number of carriers continues to increase. As mentioned above, the significant decrease in mean error as the number of carriers approaches 10 is due to the fact that around 4-6 carriers in a multi-frequency signal are sufficient for overcoming Rayleigh fading, which accounts for the decrease in mean error. Quasi-coherent integration exhibits an even greater marked decrease in mean error as the number of carriers approaches 5, this again being due to the overcoming of Rayleigh fading by using a small number of carriers. As can be seen, a further decrease in mean error for quasi-coherent integration occurs as the number of carriers increases as the non-linear issue of the phase change is compensated for. The decrease in mean error slows down with the increase in carriers since as was shown above, the improvement in SNR when factoring in the non-linear phase change of the backscattered signals improves as a function of the root of the number of carriers and not directly as a function of the number of carriers.

Figure 9A:
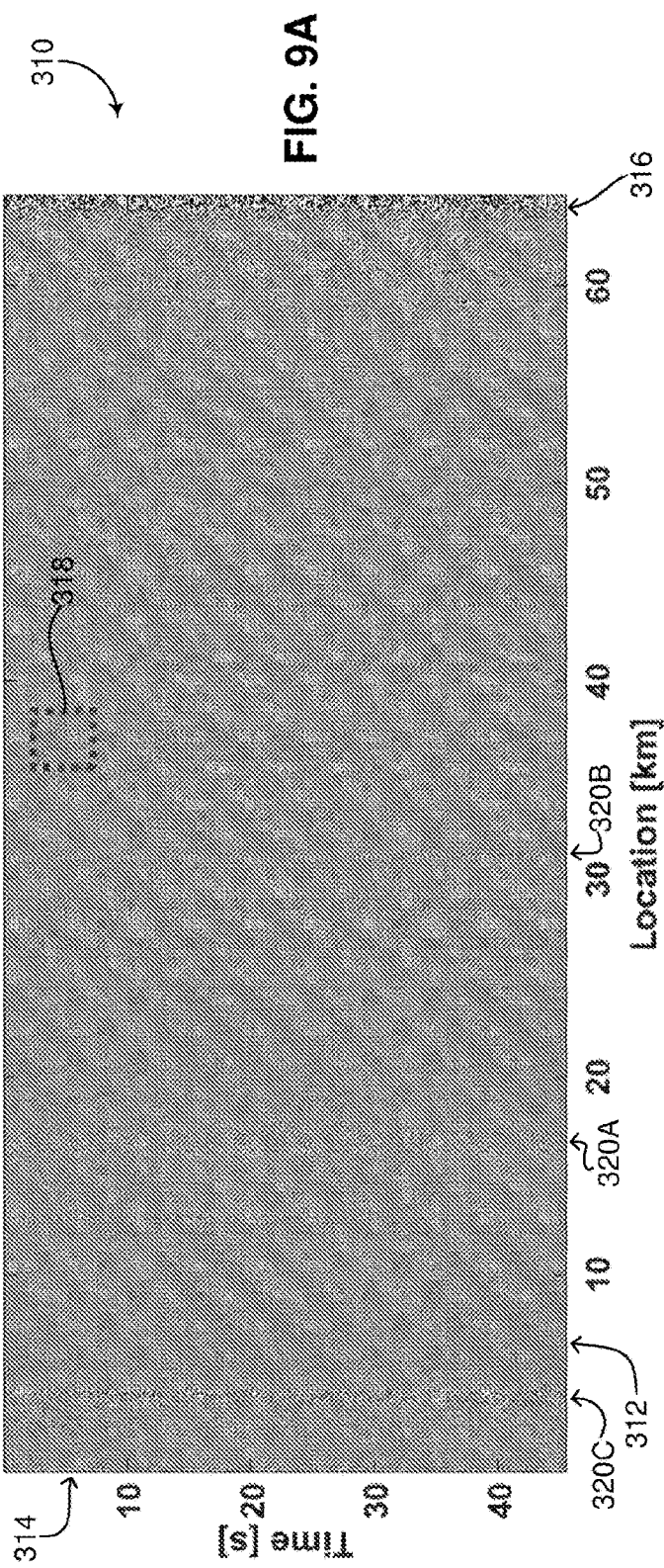
FIGS. 9A and 9B are an example of a seismographic waterfall image and close-up demonstrating real-time event detection, processing, classification and alerting of a DAS sensing system, constructed and 5 operative in accordance with another embodiment of the disclosed technique.
Figure 9B:
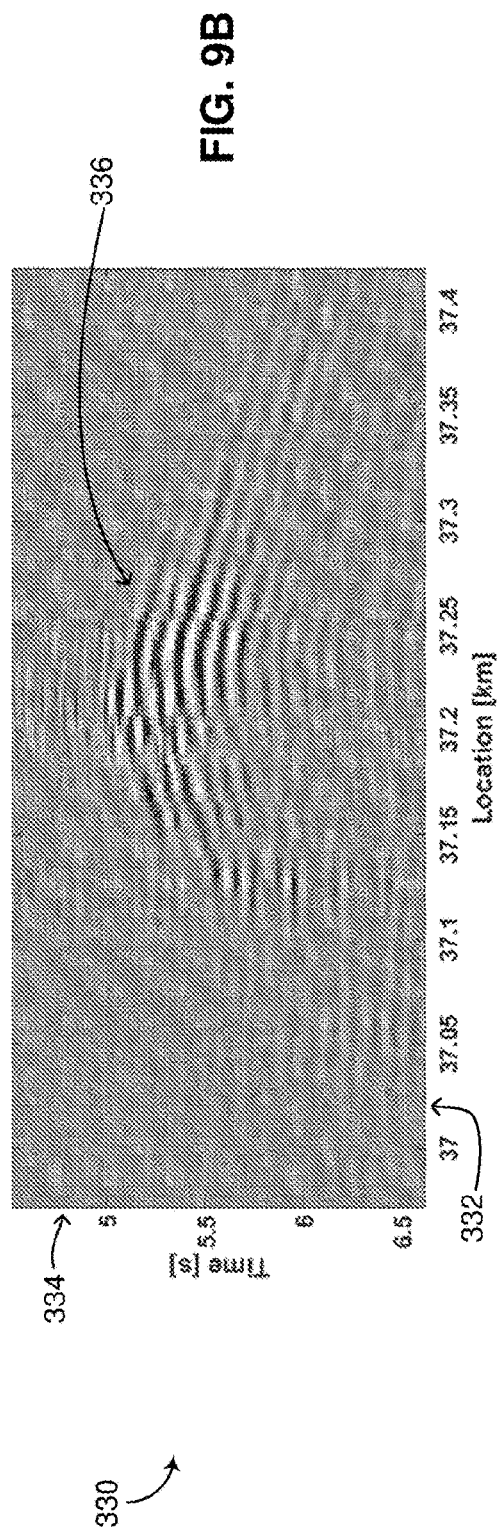

Reference is now made to FIGS. 9A and 9B, which are an example of a seismographic waterfall image and close-up demonstrating real-time event detection, processing, classification and alerting of a DAS sensing system, generally referenced 310 and 330 respectively, constructed and operative in accordance with another embodiment of the disclosed technique. With reference to FIG. 9A, shown is a seismographic waterfall image over 65 km of an underground optical fiber. A waterfall image in this context represents a map of the phase changes and is essentially the result of the quasi-coherent detection of the disclosed technique. The image is a map of the phase changes that are based on a quasi-coherent detection of the backscatter of a multi-wavelength transmitted signal. Seismogaphic waterfall image 310 is from an actual fiber optic line in which an event was instigated (as described below) to experiment with the disclosed technique. Waterfall image 310 includes an X-axis 312 representing a location along an optical fiber in kilometers, with a line 316 showing an end of the optical fiber, and a Y-axis 314 representing the time in seconds. Thus a map of phase changes along the entire length of the optical fiber can be shown as a function of time. When an event is detected, such as shown in a square 318, the phase change can be color-coded and can then be inspected for classification of the event. As shown are a number of lines for example 320A, 320B and 320C which appear to occur at 17 km, 31 km and 3 km respectively, which represent common activity such as construction sites, roads and trains. Thus as daily activity occurs at these sites, seismographic waterfall image 310 shows that there are changes in the index of refraction at those locations. All observable non-zero phases are the result of such activities and no Rayleigh fading can be observed. As shown in square 318, the event occurring there is not visible to the eye. With reference to FIG. 9B, a zoom in of square 318 (FIG. 9A) is shown, thus showing a zoomed in waterfall image 330. The waterfall image of FIG. 9B also includes an X-axis 332 representing a location along an optical fiber in kilometers and a Y-axis 334 representing the time in seconds. Given the zoom in, the X-axis shows a distance along the optical fiber ranging from 37.0 kilometers to 37.4 kilometers, thus showing a range of approximately 400 meters. A phase change 336 representing an event on the optical fiber is clearly shown via a color difference and a texture difference. As shown, the SNR of the disclosed technique enables different events to be distinguished at high spatial resolution over the entire range (in this example, the spatial resolution is around 20 meters). Phase change 336 can thus be used to alert a DAS system of a suspicious event over the optical fiber in real-time. It is noted that the shape, length, intensity and/or repetition of a phase change on such a map can be used by a classifier to classify the kind of event which occurred along the optical fiber.

It is further noted that in comparing the disclosed technique to the prior art mentioned in the background section, the disclosed technique extracts information from a backscattered signal by measuring phase differences and using an aggregation process for each of the backscattered signals coming from the carriers of the multi-wavelength signal. In some of the prior art, information is extracted by measuring the amplitude of a backscattered signal and thus there is no correlation between the strength of a disturbance along the fiber optic where backscattered signals are received from to the received backscattered signal where the information is extracted from. It is noted that by improving the SNR of the backscattered signals, the FAR can be lowered since detection of events over a fiber optic is improved. According to the disclosed technique, by overcoming the noise issues with the non-linearity of the phase changes in the backscattered signals, better classification of events can also be achieved.

Figure 10:
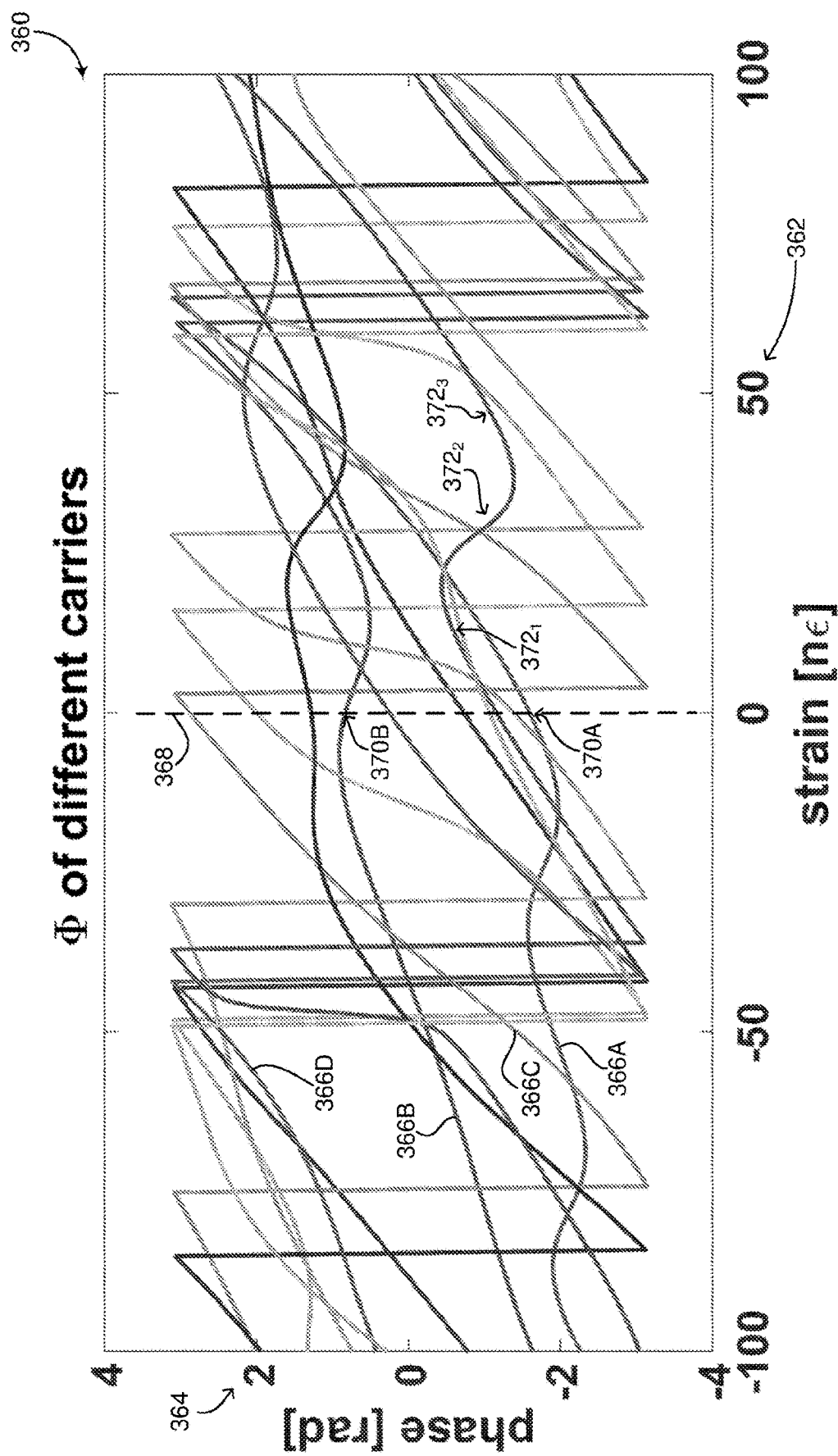
FIG. 10 is a graph showing a simulation of the phase in Equation (10) of different carriers for varying strains applied to a backscattering cell in a fiber optic, constructed and operative in 10 accordance with a further development embodiment of the disclosed technique.

Reference is now made to FIG. 10, which is a graph showing a simulation of the phase in Equation (10) of different carriers for varying strains applied to a backscattering cell in a fiber optic, generally referenced 360, constructed and operative in accordance with a further development of the disclosed technique. As described above in the mathematical treatment in the description of FIG. 5, the phases da (z) of a multi-frequency backscattered signal from a given backscattering cell are themselves different for the different carrier frequencies and the fluctuations of the strain are different and thus yield different changes for the different carriers. This is now graphically shown in FIG. 10. As shown, graph 360 includes an X-axis 362 showing changes in strain as applied to a fiber optic in units of nanostrain (nε). The center of graph 360 includes a dotted line 368 which shows 0 strain. Graph 360 also includes a Y-axis 364 in units of radians, showing the changes in phase. Each one of curves 366A-366D represents a different carrier in the multi-frequency backscattered signal. Whereas only four different carriers are labeled, graph 360 shows the different in phase for ten different carriers. By looking at dotted line 368, it can clearly be seen that at a strain of 0, each of the carriers has a different phase. Thus as shown by arrows 370A and 370B, which show the phases of two different carriers, each carrier has a different phase which is random and arbitrary and cannot be assumed to be 0 radians at 0 strain. In addition, graph 360 shows that the change in phase as the strain increases is not a linear function and is not always monotonic. Three different sections of a selected carrier are shown by arrows $372_1$, $372_2$ and $372_3$. As the strain increases, it can be seen that for this carrier, in section $372_1$ there is an increase in phase as the strain increases, then in section $372_2$ there is a decrease in phase as the strain increases and finally in section $372_3$ there is again an increase in phase as the strain increases. It is thus clear that when multiple carriers are used for a signal in a DAS system, it cannot be assumed that the phase changes per carrier are linear and the non-linearity challenge as presented in the background section (challenge (4)) needs to be addressed. As described above, the disclosed technique, in particular the aggregation of the processed data from each channel of the backscattered signal, presents a solution to challenge (4) for mitigating the noise generated by the non-linear response of the backscattered signals.

It will be appreciated by persons skilled in the art that the disclosed technique is not limited to what has been particularly shown and described hereinabove. Rather the scope of the disclosed technique is defined only by the claims, which follow.

The invention claimed is:
1. Distributed acoustic sensing (DAS) system for quasi-coherent detection of at least one multi-frequency signal over an optical fiber, comprising:
a multi-frequency pulse generator, for generating at least one multi-frequency pulse train comprising at least two pulses each having a different frequency, said multi-frequency pulse train comprising a plurality of carriers;
a circulator, coupled with said multi-frequency pulse generator and said optical fiber;
a coherent detector, coupled with said circulator and with said multi-frequency pulse generator, for receiving at least one backscattered signal from said optical fiber; and
a processor, coupled with said coherent detector, for quasi-coherent aggregation of said plurality of carriers in said at least one backscattered signal,
wherein said processor channelizes said at least one backscattered signal into at least one complex signal for each frequency in said plurality of carriers;
wherein for each said at least one complex signal, said processor respectively extracts at least one of an amplitude change and a phase change for each one of said plurality of carriers, and selectively aggregates said at least one of said amplitude change and said phase change for said plurality of carriers for determining if an event has occurred over said optical fiber; and
wherein said selective aggregation is executed according to respective carrier noise in each one of said plurality of carriers and is weighted to maximize at least one of a signal-to-noise ratio (SNR) and a linearity of said at least one complex signal.

2. The DAS system according to claim 1, wherein multi-frequency pulse generator comprises:
a laser;
a beam splitter, coupled with said laser; and
at least two modulators, wherein at least a first one of said at least two modulators is coupled with said beam splitter.

3. The DAS system according to claim 2, wherein said laser is selected from the list consisting of:
an ultranarrow linewidth laser;
a distributed-feedback fiber laser;
an external cavity semiconductor laser; and
a single longitudinal mode narrow linewidth laser.

4. The DAS system according to claim 2, wherein said at least two modulators are selected from the list consisting of:
an acousto-optical modulator (AOM); and
an electro-optical modulator (EOM).

5. The DAS system according to claim 1, wherein said at least two modulators are coupled in a form selected from the list consisting of:
in series; and
in parallel.

6. The DAS system according to claim 2, further comprising:
an erbium-doped fiber amplifier (EDFA), coupled with at least a last one of said at least two modulators; and
a filter, coupled with said EDFA.

7. The DAS system according to claim 6, wherein said filter is selected from the list consisting of:
a Fabry-Pérot filter; and
a dense wavelength division multiplexing filter.

8. The DAS system according to claim 1, wherein said coherent detector is selected from the list consisting of:
a balanced coherent detector;
a polarization dependent balanced coherent detector;
a balanced avalanche photodiode;
an integrated coherent receiver; and
a single photodetector with a low pass filter.

9. The DAS system according to claim 1, wherein a bandwidth of said coherent detector is defined by:

$$BW=K\cdot(BW_k+d)$$

wherein K is the number of said plurality of carriers, $BW_k$ is a bandwidth of a given one of said plurality of carriers and d is a guard bandwidth.

10. The DAS system according to claim 1, wherein said processor comprises a classifier.

11. The DAS system according to claim 1, wherein said multi-frequency pulse generator comprises:
a laser;
a first beam splitter, coupled with said laser, comprising at least one input and at least two outputs;
a first modulator, coupled with a first one of said at least two outputs of said first beam splitter;

a second beam splitter, coupled with said first modulator, comprising at least two inputs and at least two outputs; and a structure loop, said loop structure comprising:
  a second modulator;
  an isolator;
  an erbium-doped fiber amplifier (EDFA); and
  a filter,
wherein at least one of said second modulator, said isolator, said EDFA and said filter is coupled with a first one of said at least two outputs of said second beam splitter;
wherein at least another one of said second modulator, said isolator, said EDFA and said filter is coupled with a second one of said at least two inputs of said second beam splitter;
wherein said first modulator is coupled with a first one of said at least two inputs of said second beam splitter;
wherein a second one of said at least two outputs of said first beam splitter is coupled with said coherent detector;
wherein a second one of said at least two outputs of said second beam splitter is coupled with said circulator.

12. The DAS system according to claim 11, wherein said second modulator is coupled with a first one of said at least two outputs of said second beam splitter;
  wherein said isolator is coupled with said second modulator;
  wherein said EDFA is coupled with said isolator; and
  wherein said filter is coupled with said EDFA and with a second one of said at least two inputs of said second beam splitter.

13. The DAS system according to claim 1, wherein said selective aggregation of said processor comprises an aggregation selected from the list consisting of:
  selecting carriers from said plurality of carriers having an amplitude above a predetermined threshold;
  extracting a respective phase measurement for each said at least one complex signal and summing said extracted phases;
  extracting a respective phase measurement from each said at least one complex signal and averaging each said phase measurement by corresponding ones of said amplitude change for said plurality of carriers;
  extracting a respective phase measurement from each said at least one complex signal and averaging each of said phase measurement by the corresponding ones of a square of said amplitude change for said plurality of carriers; and
  extracting a respective phase measurement from each said at least one complex signal and averaging each of said phase measurement by a sigmoid function of said amplitude change for said plurality of carriers.

14. The DAS system according to claim 1, wherein said at least one backscattered signal is a result of interference of said at least one backscattered signal from at least one backscattering cell along said optical fiber, wherein at least one backscattering cell defines a region on said optical fiber from where said phase measurement is derived, and wherein said selective aggregation of said processor comprises an aggregation selected from the list consisting of:
  respectively determining a change in phase for each one of said at least two backscattering cells for each one of said plurality of carriers separately and weighting each determined change in phase according to a corresponding product of a square of an amplitude measurement;
  respectively determining a change in phase for each one of said at least two backscattering cells for each one of said plurality of carriers separately and weighting each one of said at least two backscattering cells by a corresponding product of said amplitude measurement; and
  respectively determining a change in phase for each one of said at least two backscattering cells for each one of said plurality of carriers separately and weighting each one of said at least two backscattering cells by a sigmoid function of a corresponding product of said amplitude measurement.

15. The DAS system according to claim 1, wherein said selective aggregation of said processor comprises a first aggregation according to said selective aggregation and a second aggregation according to coherent integration.

16. The DAS system according to claim 15, wherein a result of said first aggregation and said second aggregation are combined using a weighting function.

17. The DAS system according to claim 1, wherein said multi-frequency pulse generator, said circulator and said coherent detector are polarization maintaining.

18. The DAS system according to claim 16, wherein said selective aggregation of said processor comprises treating each one of said plurality of carriers as two separate and independent carriers based on each polarization of each one of said plurality of carriers.

19. The DAS system according to claim 18, wherein said selective aggregation of said processor comprises an aggregation of polarization changes in said two separate and independent carriers.

20. The DAS system according to claim 1, wherein said multi-frequency pulse generator generates said at least one multi-frequency pulse train such that at least one pulse in said at least one multi-frequency pulse train has a long pulse width and at least another pulse in said at least one multi-frequency pulse train has a short pulse width.

21. The DAS system according to claim 1, wherein at least one parameter of said multi-frequency pulse generator is dynamically modified according to said determining of said event occurring over said optical fiber.

22. The DAS system according to claim 13, wherein said selective aggregation of said processor is dynamically modified according to said determining of said event occurring over said optical fiber.

23. Method for distributed acoustic sensing (DAS) for quasi-coherent detection of at least one multi-frequency signal over an optical fiber, comprising the procedures of:
  generating at least one multi-frequency pulse train comprising at least two pulses each having a different frequency, said multi-frequency pulse train comprising a plurality of carriers;
  receiving at least one backscattered signal from said optical fiber;
  channelizing said at least one backscattered signal into at least one complex signal for each frequency in said plurality of carriers; and
  selectively aggregating said plurality of carriers in said at least one backscattered signal for determining if an event has occurred over said optical fiber;
  wherein said procedure of selectively aggregating said plurality of carriers comprises the sub-procedures of:
    for each said at least one complex signal, respectively extracting at least one of an amplitude change and a phase change for each one of said plurality of carriers; and aggregating and weighting each one of said plurality of carriers according to respective carrier noise for maximizing at least one of a signal-to-noise ratio (SNR) and a linearity of said at least one complex signal.

24. The method for DAS according to claim 23, wherein said procedure of selectively aggregating comprises a sub-procedure of aggregation selected from the list consisting of:
  selecting carriers from said plurality of carriers having an amplitude above a predetermined threshold;
  extracting a respective phase measurement for each said at least one complex signal and summing said extracted phases;
  extracting a respective phase measurement from each said at least one complex signal and averaging each said phase measurement by corresponding ones of said amplitude change for said plurality of carriers;
  extracting a respective phase measurement from each said at least one complex signal and averaging each of said phase measurement by the corresponding ones of a square of said amplitude change for said plurality of carriers; and
  extracting a respective phase measurement from each said at least one complex signal and averaging each of said phase measurement by a sigmoid function of said amplitude change for said plurality of carriers.

25. The method for DAS according to claim 23, wherein said at least one backscattered signal is a result of interference of said at least one backscattered signal from at least one backscattering cell along said optical fiber, wherein said at least one backscattering cell defines a region on said optical fiber from where said phase measurement is derived, and wherein said procedure of selectively aggregating comprises a sub-procedure of aggregation selected from the list consisting of:
  respectively determining a change in phase for each one of at least two backscattering cells for each one of said plurality of carriers separately and weighting each determined change in phase according to a corresponding product of a square of an amplitude measurement;
  respectively determining a change in phase for each one of said at least two backscattering cells for each one of said plurality of carriers separately and weighting each one of said at least two backscattering cells by a corresponding product of said amplitude measurement; and
  respectively determining a change in phase for each one of said at least two backscattering cells for each one of said plurality of carriers separately and weighting each one of said at least two backscattering cells by a sigmoid function of a corresponding product of said amplitude measurement.

26. The method for DAS according to claim 23, wherein said procedure of selectively aggregating comprises a first aggregation according to said procedure of selectively aggregating and a second aggregation according to coherent integration.

27. The method for DAS according to claim 26, further comprising the procedure of combining a result of said first aggregation and said second aggregation using a weighting function.

28. The method for DAS according to claim 23, wherein said procedure of selectively aggregating comprises an aggregation wherein each one of said plurality of carriers is treated as two separate and independent carriers based on each polarization of each one of said plurality of carriers.

29. The method for DAS according to claim 28, wherein said procedure of selectively aggregating comprises an aggregation of polarization changes in said two separate and independent carriers.

30. The method for DAS according to claim 23, wherein said multi-frequency pulse train comprises at least one pulse having a long pulse width and at least another pulse having a short pulse width.

31. The method for DAS according to claim 23, further comprising the procedure of dynamically modifying at least one parameter of said multi-frequency pulse train according to said determining of said event occurring over said optical fiber.

32. The method for DAS according to claim 24, further comprising the procedure of dynamically modifying said procedure of selectively aggregating according to said determining of said event occurring over said optical fiber.

33. The DAS system according to claim 14, wherein said selective aggregation of said processor is dynamically modified according to said determining of said event occurring over said optical fiber.

34. The method for DAS according to claim 25, further comprising the procedure of dynamically modifying said procedure of selectively aggregating according to said determining of said event occurring over said optical fiber.

* * * * *